(12) United States Patent
Kawana

(10) Patent No.: US 8,081,391 B1
(45) Date of Patent: Dec. 20, 2011

(54) ZOOM LENS FOR PROJECTION AND PROJECTION-TYPE DISPLAY APPARATUS

(75) Inventor: Masanao Kawana, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/152,827

(22) Filed: Jun. 3, 2011

(30) Foreign Application Priority Data

Jun. 3, 2010 (JP) .................................. 2010-127440

(51) Int. Cl.
*G02B 15/14* (2006.01)

(52) U.S. Cl. ........ 359/680; 359/681; 359/682; 359/683; 359/684; 359/685; 359/686; 359/714; 359/740; 359/770

(58) Field of Classification Search .......... 359/680–686, 359/714, 740, 770
See application file for complete search history.

(56) References Cited

U.S. PATENT DOCUMENTS

| | | | | |
|---|---|---|---|---|
| 6,587,279 B2* | 7/2003 | Narimatsu et al. | ............ | 359/683 |
| 7,522,348 B2* | 4/2009 | Nagahara | ...................... | 359/683 |
| 7,542,213 B2* | 6/2009 | Yamamoto | .................... | 359/676 |
| 7,706,079 B2* | 4/2010 | Kawana | ........................ | 359/680 |
| 7,855,840 B2* | 12/2010 | Minefuji | ........................ | 359/682 |
| 2009/0015934 A1* | 1/2009 | Amano | .......................... | 359/649 |
| 2009/0262437 A1* | 10/2009 | Nagatoshi | ..................... | 359/683 |

FOREIGN PATENT DOCUMENTS

| | | |
|---|---|---|
| JP | 2004-109896 | 4/2004 |
| JP | 2004-279958 | 10/2004 |
| JP | 2005-156963 | 6/2005 |
| JP | 2009-069539 | 4/2009 |
| JP | 2009-069540 | 4/2009 |

* cited by examiner

*Primary Examiner* — Evelyn A. Lester
(74) *Attorney, Agent, or Firm* — Young & Thompson

(57) ABSTRACT

A zoom lens for projection includes a negative first group composed of two lenses, a second group composed of a positive lens, an aperture stop, a third group composed of a positive lens, a fourth group composed of a negative fourth-group-first lens, a fourth-group-second lens arranged in such a manner that a negative air lens is formed between the fourth-group-first lens and the fourth-group-second lens, and a positive fourth-group-third lens, and a fifth group composed of a positive lens having a convex surface facing the magnification side of the zoom lens, which are arranged in this order from the magnification side. Further, the following formula (1) is satisfied:

$$-0.6 < (R_{72} + R_{71})/(R_{72} - R_{71}) < 0.6 \qquad (1), \text{where}$$

$R_{71}$ is a radius of curvature of a magnification-side surface of the fourth-group-third lens, and
$R_{72}$ is a radius of curvature of a reduction-side surface of the fourth-group-third lens.

20 Claims, 21 Drawing Sheets

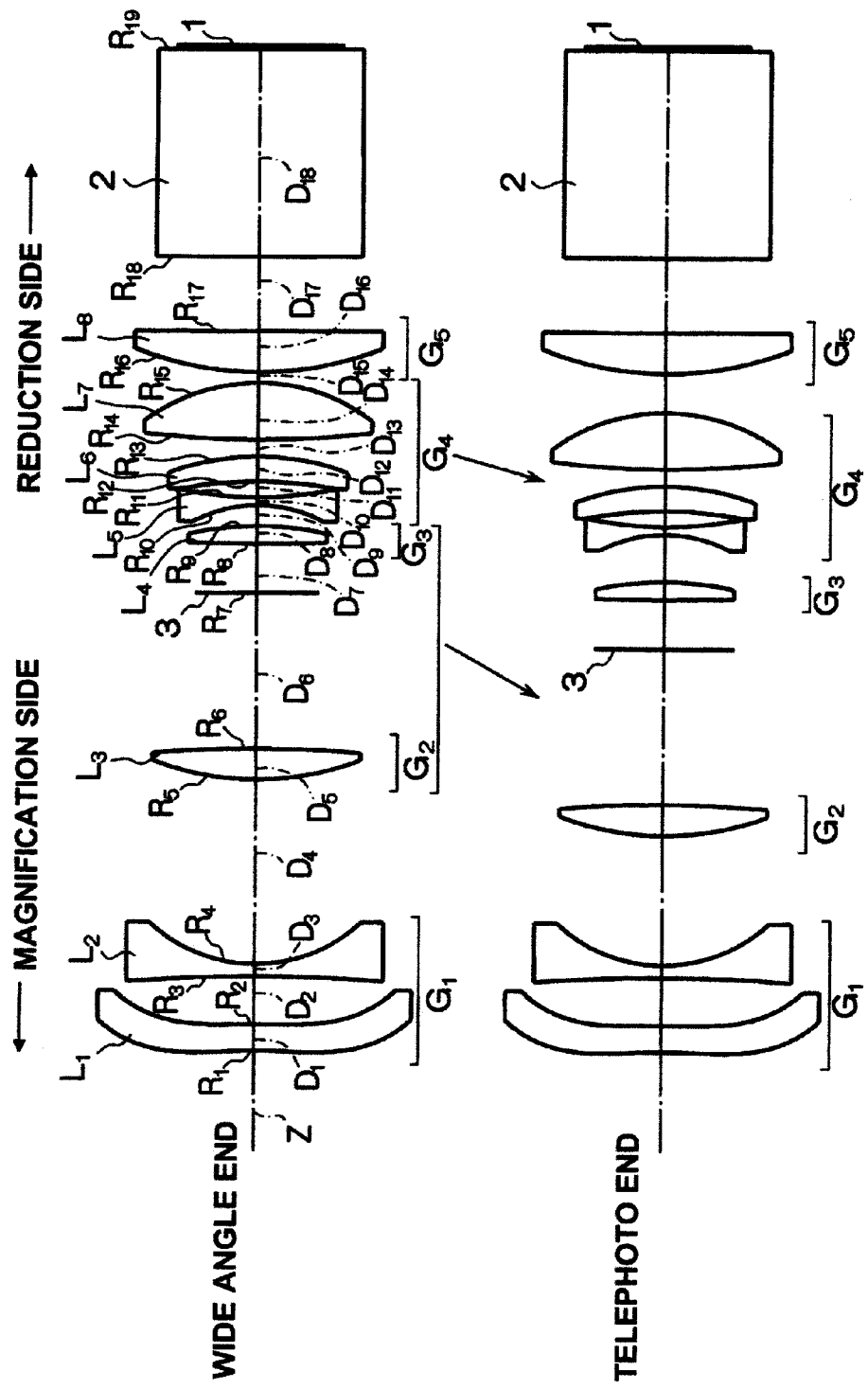

EXAMPLE 1
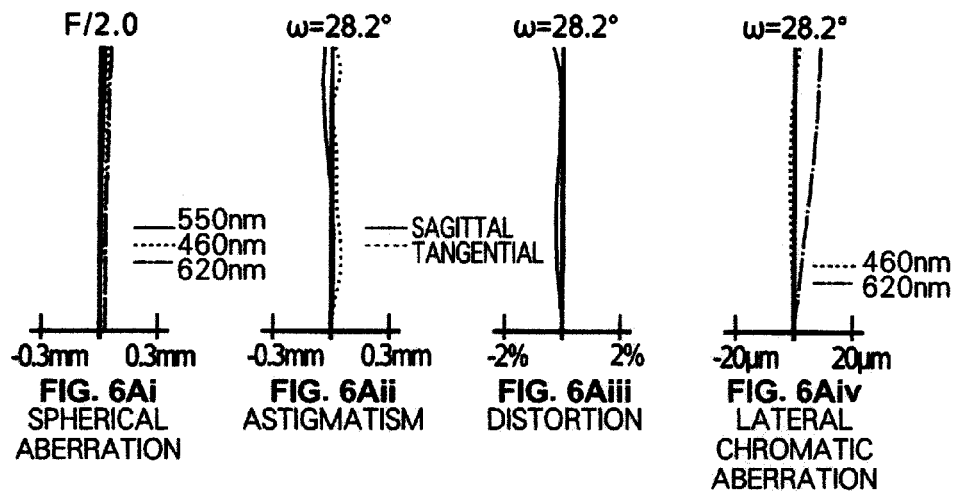
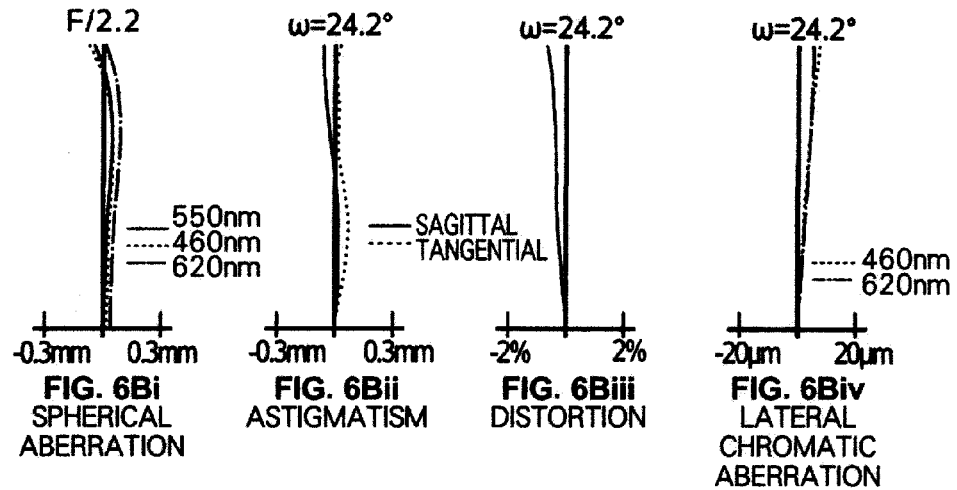

EXAMPLE 1
WIDE ANGLE END
COMA ABERRATION
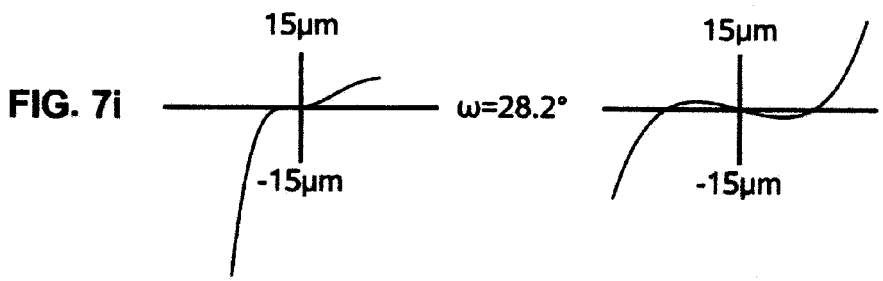
FIG. 7i  ω=28.2°
FIG. 7ii  ω=23.2°
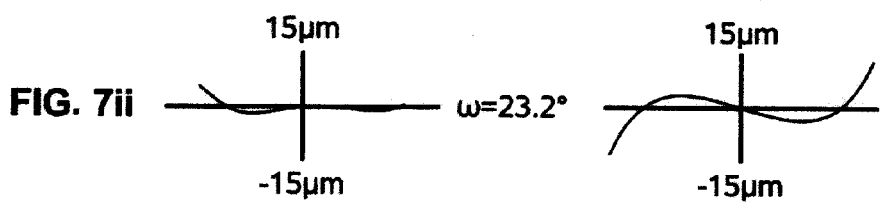
FIG. 7iii  ω=17.8°
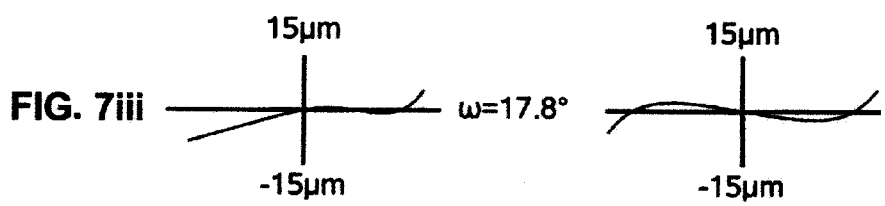
FIG. 7iv  ω=12.1°
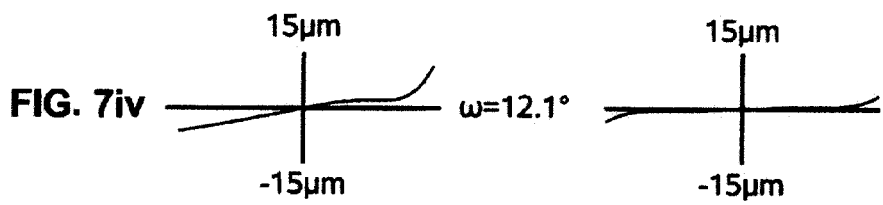
FIG. 7v  ω=0°
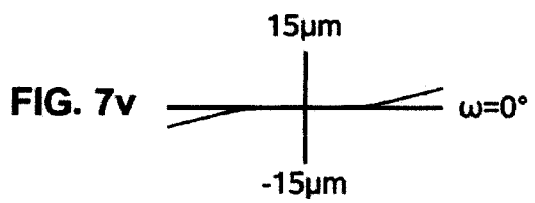

EXAMPLE 1
TELEPHOTO END
COMA ABERRATION
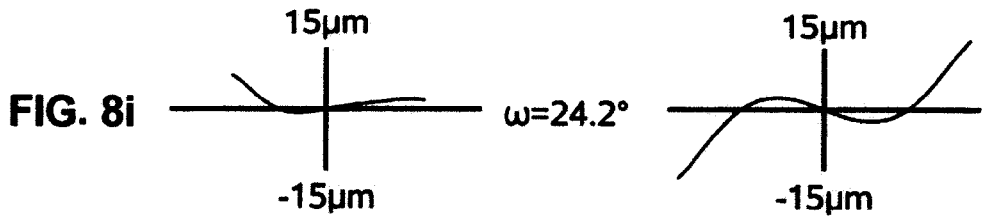
FIG. 8i  ω=24.2°
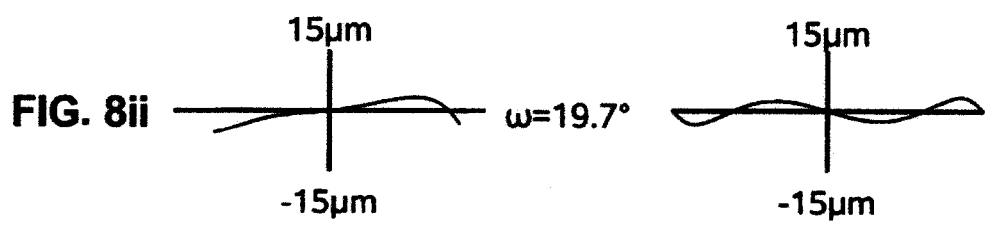
FIG. 8ii  ω=19.7°
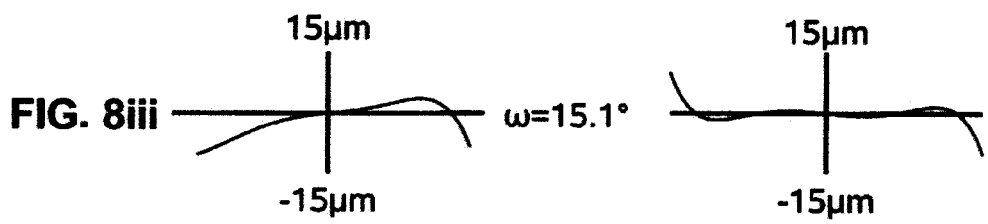
FIG. 8iii  ω=15.1°
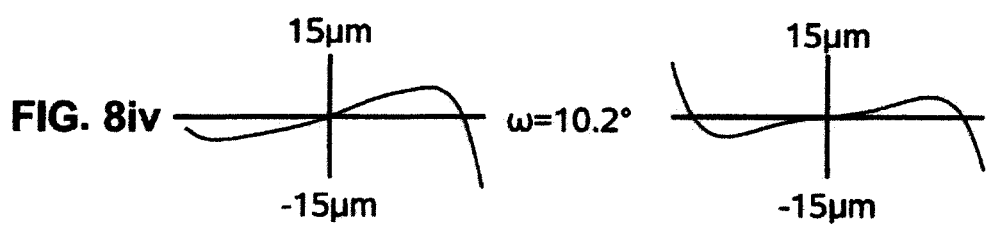
FIG. 8iv  ω=10.2°
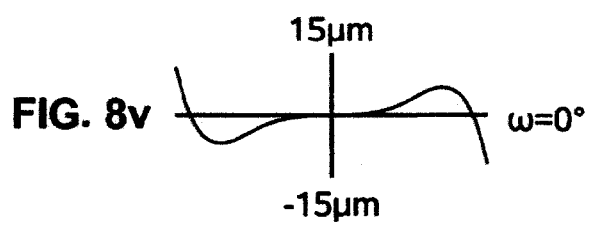
FIG. 8v  ω=0°

EXAMPLE 2
WIDE ANGLE END
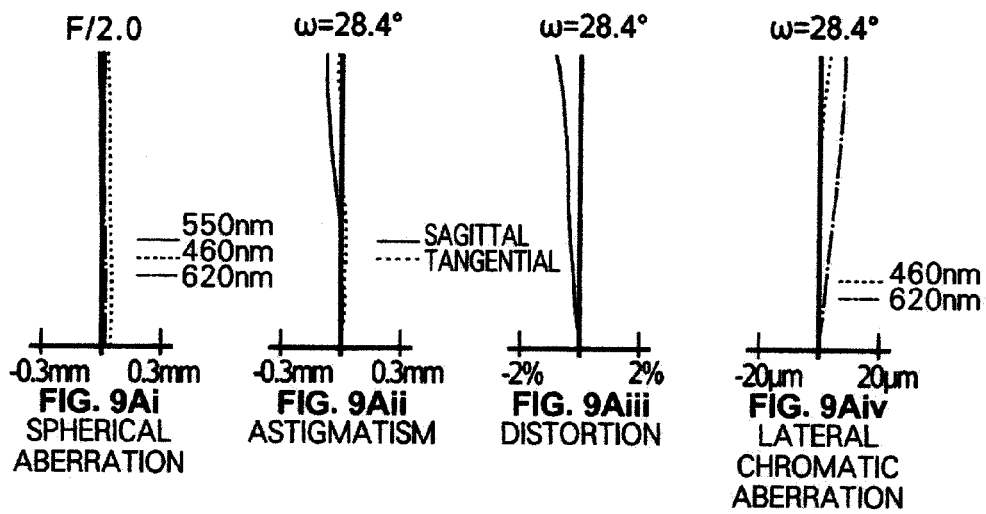
FIG. 9Ai SPHERICAL ABERRATION
FIG. 9Aii ASTIGMATISM
FIG. 9Aiii DISTORTION
FIG. 9Aiv LATERAL CHROMATIC ABERRATION
TELEPHOTO END
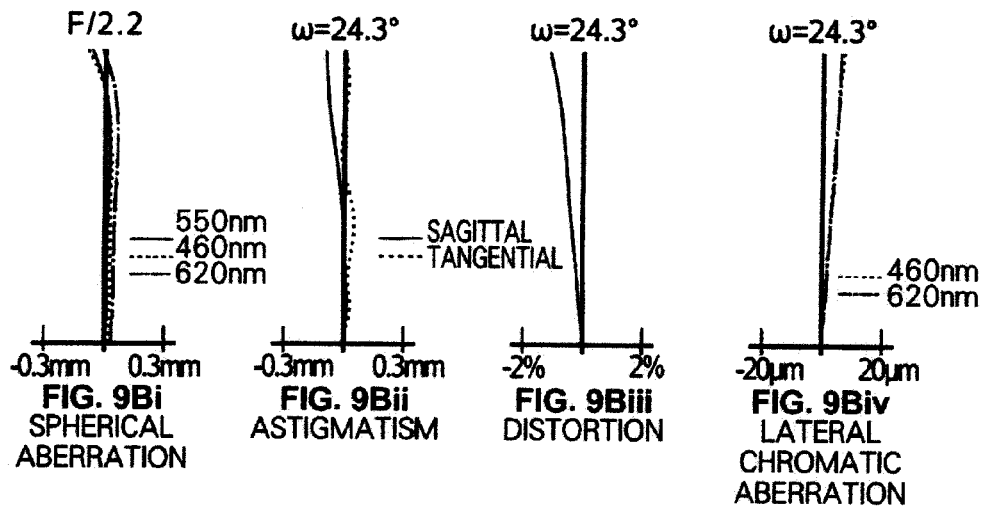
FIG. 9Bi SPHERICAL ABERRATION
FIG. 9Bii ASTIGMATISM
FIG. 9Biii DISTORTION
FIG. 9Biv LATERAL CHROMATIC ABERRATION

EXAMPLE 2
WIDE ANGLE END
COMA ABERRATION
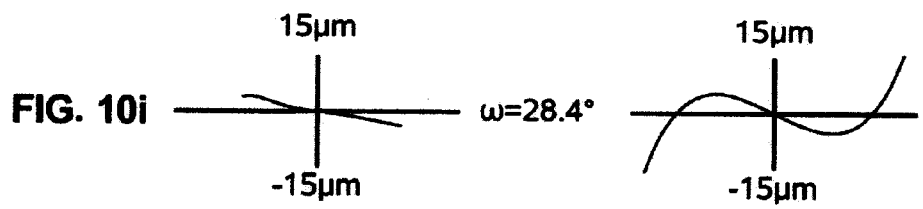
FIG. 10i — $\omega=28.4°$
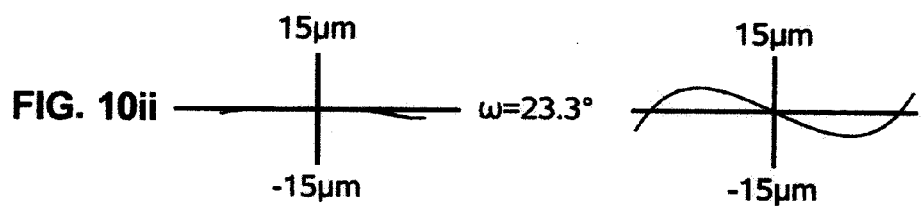
FIG. 10ii — $\omega=23.3°$
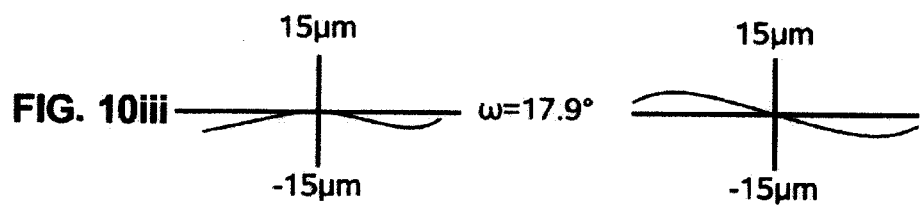
FIG. 10iii — $\omega=17.9°$
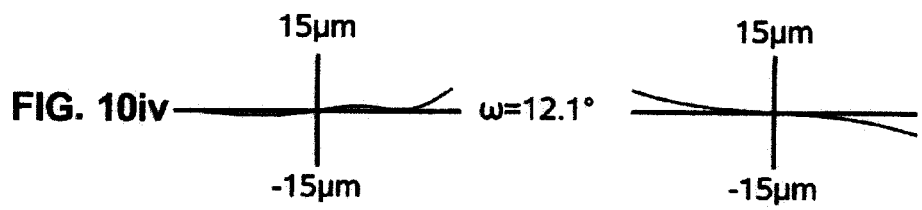
FIG. 10iv — $\omega=12.1°$
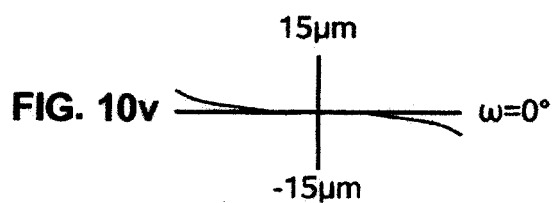
FIG. 10v — $\omega=0°$

EXAMPLE 2
TELEPHOTO END
COMA ABERRATION
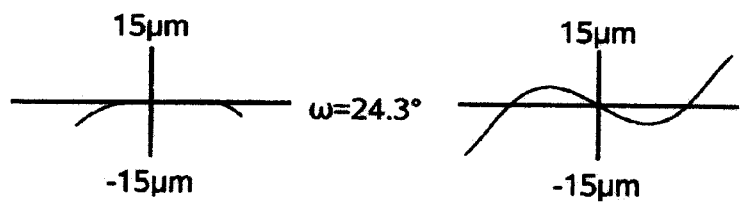
FIG. 11i  ω=24.3°
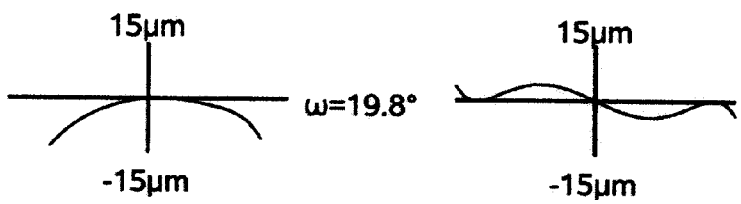
FIG. 11ii  ω=19.8°
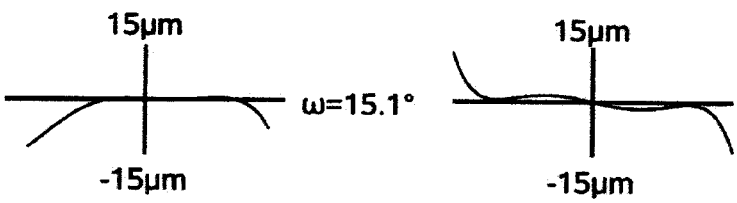
FIG. 11iii  ω=15.1°
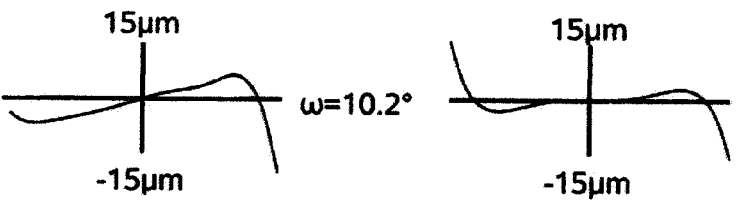
FIG. 11iv  ω=10.2°
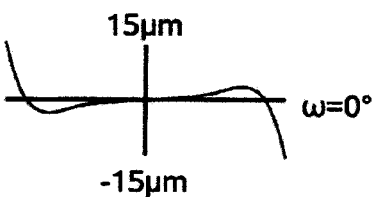
FIG. 11v  ω=0°

EXAMPLE 3
WIDE ANGLE END
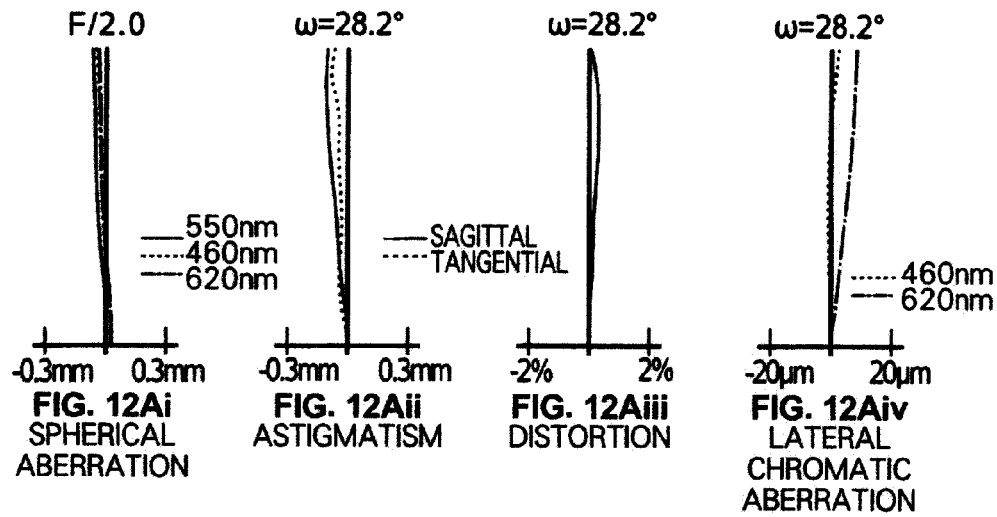
FIG. 12Ai SPHERICAL ABERRATION
FIG. 12Aii ASTIGMATISM
FIG. 12Aiii DISTORTION
FIG. 12Aiv LATERAL CHROMATIC ABERRATION
TELEPHOTO END
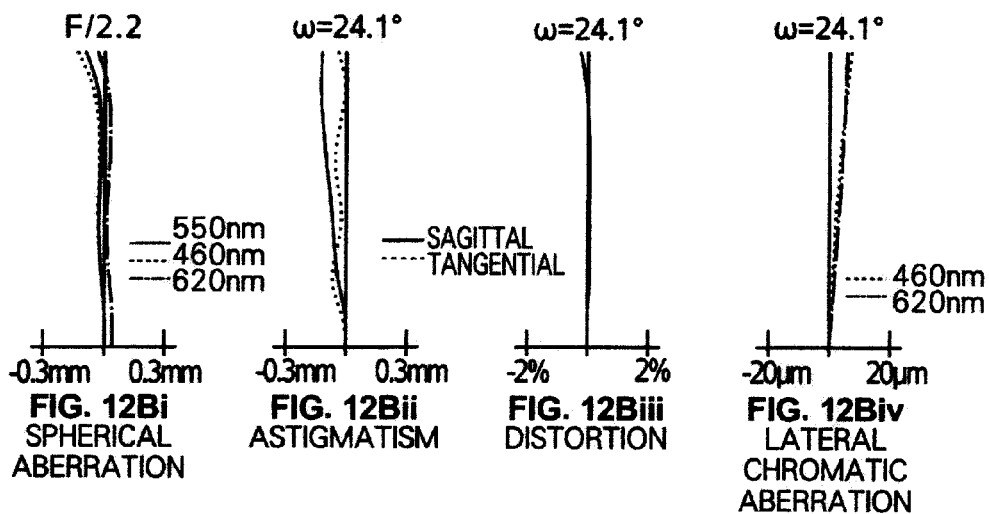
FIG. 12Bi SPHERICAL ABERRATION
FIG. 12Bii ASTIGMATISM
FIG. 12Biii DISTORTION
FIG. 12Biv LATERAL CHROMATIC ABERRATION

EXAMPLE 3
WIDE ANGLE END
COMA ABERRATION
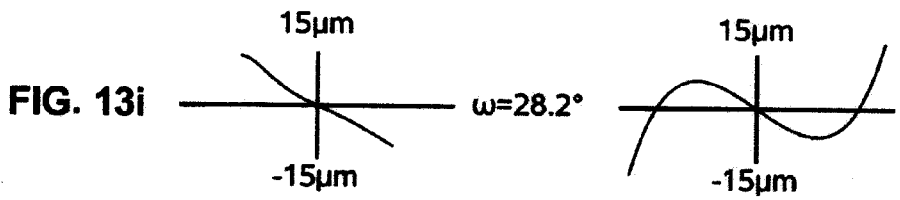
FIG. 13i  ω=28.2°
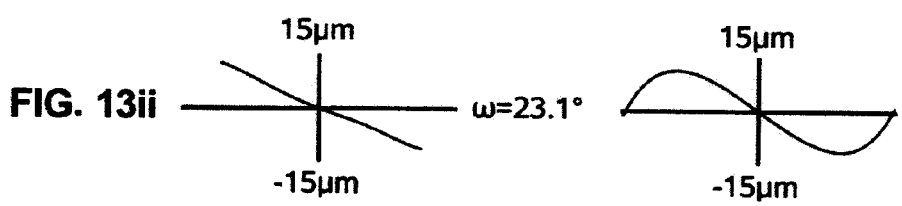
FIG. 13ii  ω=23.1°
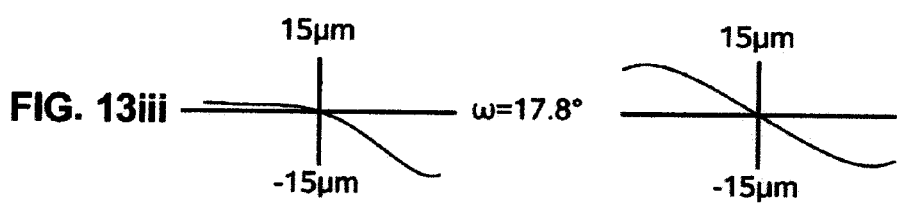
FIG. 13iii  ω=17.8°
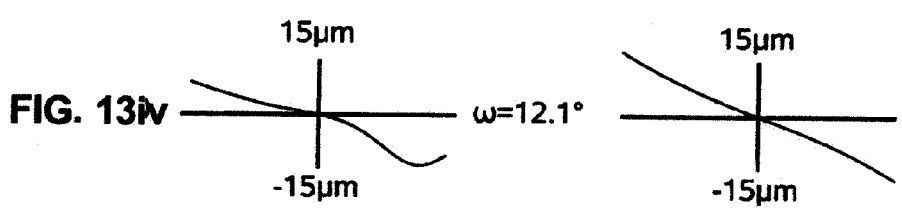
FIG. 13iv  ω=12.1°
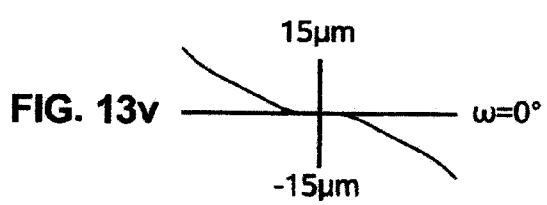
FIG. 13v  ω=0°

EXAMPLE 3
TELEPHOTO END
COMA ABERRATION
  ω=24.1°
  ω=19.7°
FIG. 14iii 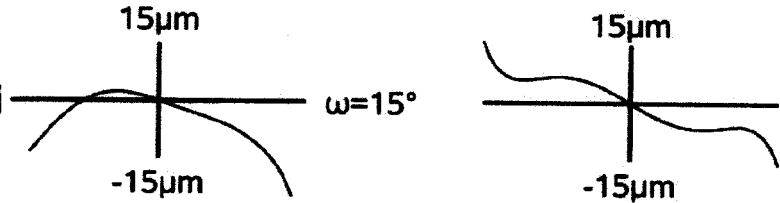 ω=15°
  ω=10.1°
  ω=0°

EXAMPLE 4
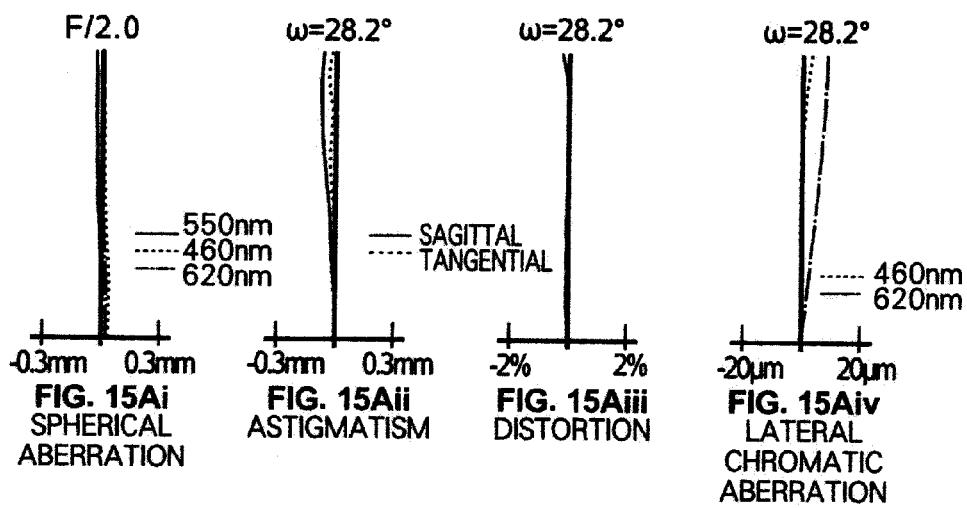
WIDE ANGLE END
FIG. 15Ai SPHERICAL ABERRATION
FIG. 15Aii ASTIGMATISM
FIG. 15Aiii DISTORTION
FIG. 15Aiv LATERAL CHROMATIC ABERRATION
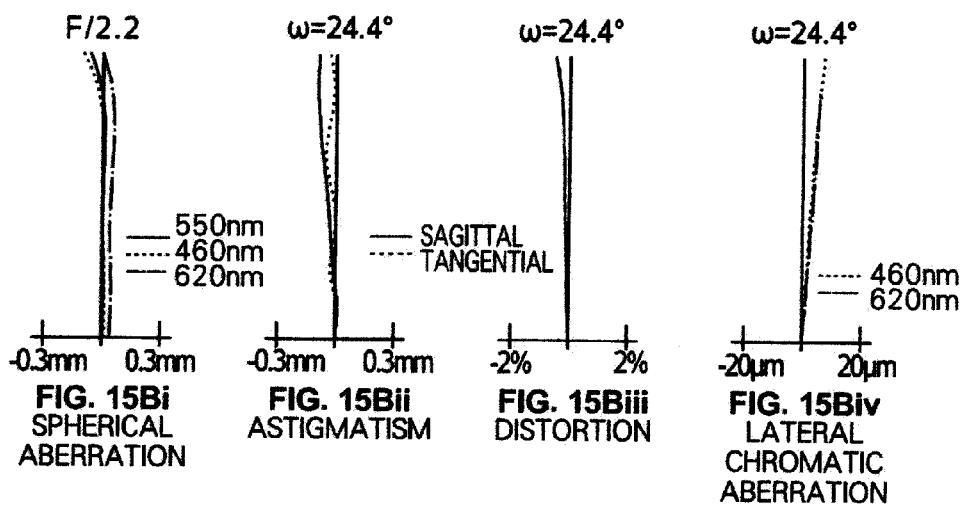
TELEPHOTO END
FIG. 15Bi SPHERICAL ABERRATION
FIG. 15Bii ASTIGMATISM
FIG. 15Biii DISTORTION
FIG. 15Biv LATERAL CHROMATIC ABERRATION

EXAMPLE 4
WIDE ANGLE END
COMA ABERRATION
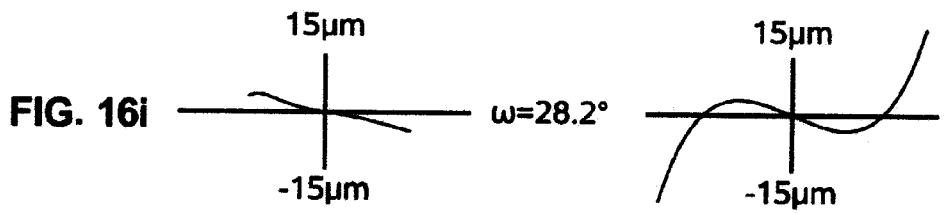
FIG. 16i, ω=28.2°
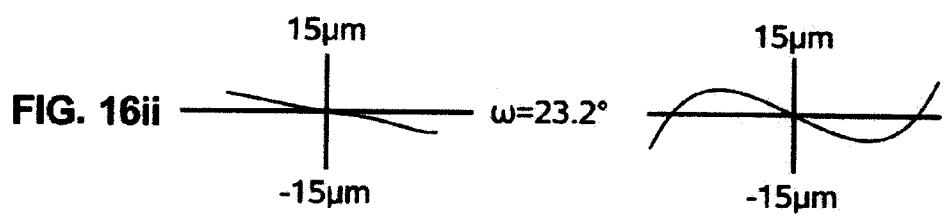
FIG. 16ii, ω=23.2°
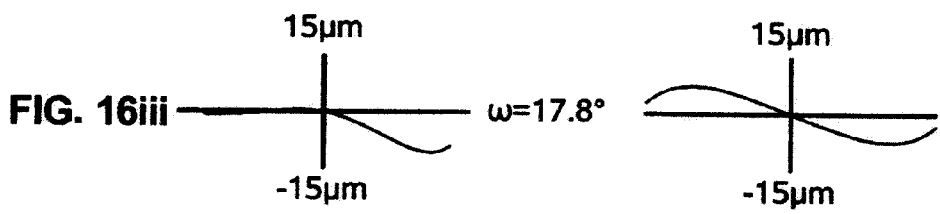
FIG. 16iii, ω=17.8°
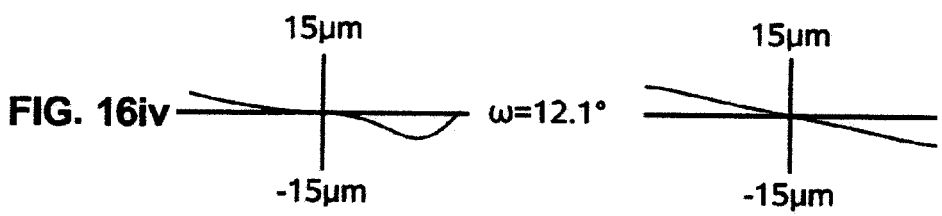
FIG. 16iv, ω=12.1°
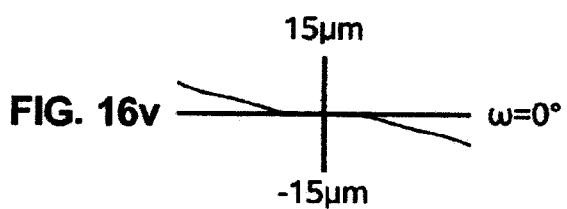
FIG. 16v, ω=0°

EXAMPLE 4
TELEPHOTO END
COMA ABERRATION
  $\omega=24.2°$
  $\omega=19.7°$
FIG. 17iii 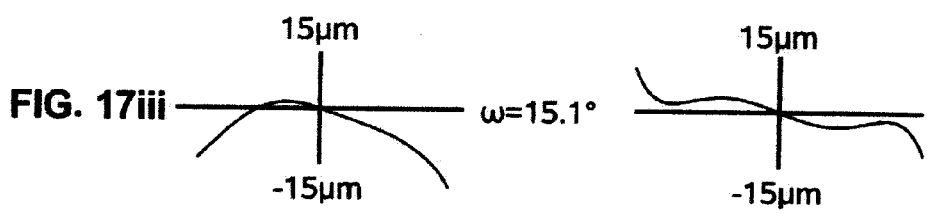 $\omega=15.1°$
  $\omega=10.2°$
  $\omega=0°$

EXAMPLE 5
WIDE ANGLE END
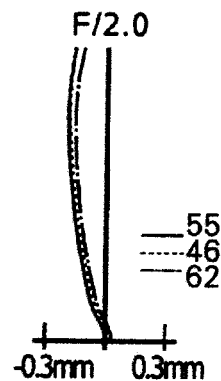
FIG. 18Ai
SPHERICAL
ABERRATION
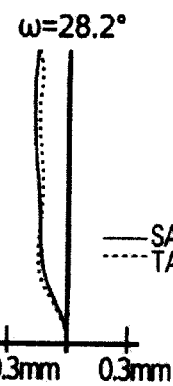
FIG. 18Aii
ASTIGMATISM
FIG. 18Aiii
DISTORTION
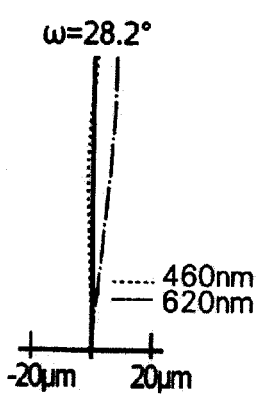
FIG. 18Aiv
LATERAL
CHROMATIC
ABERRATION
TELEPHOTO END
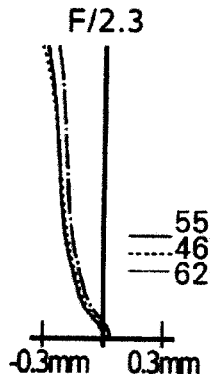
FIG. 18Bi
SPHERICAL
ABERRATION
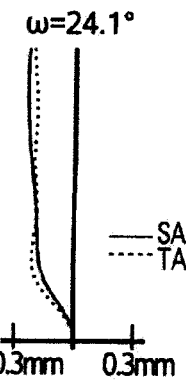
FIG. 18Bii
ASTIGMATISM
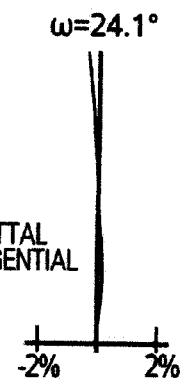
FIG. 18Biii
DISTORTION
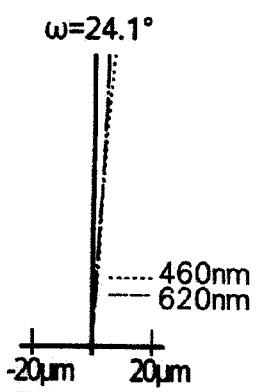
FIG. 18Biv
LATERAL
CHROMATIC
ABERRATION

EXAMPLE 5
WIDE ANGLE END
COMA ABERRATION
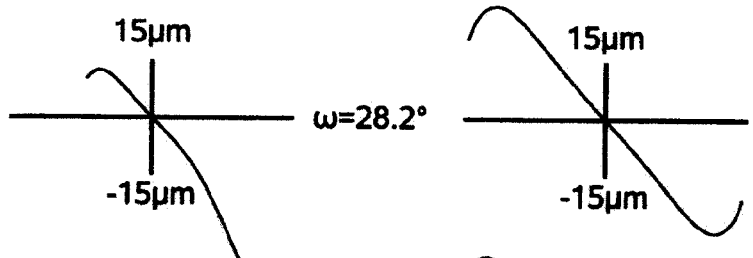
FIG. 19i  ω=28.2°
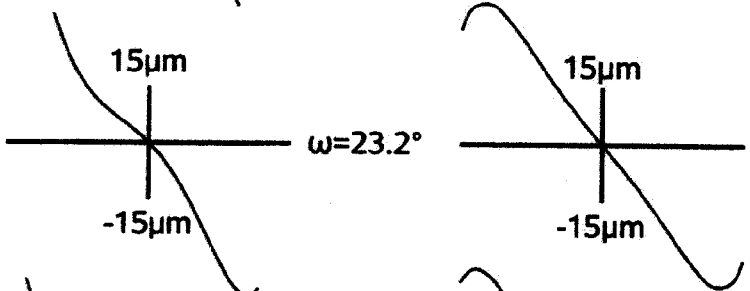
FIG. 19ii  ω=23.2°
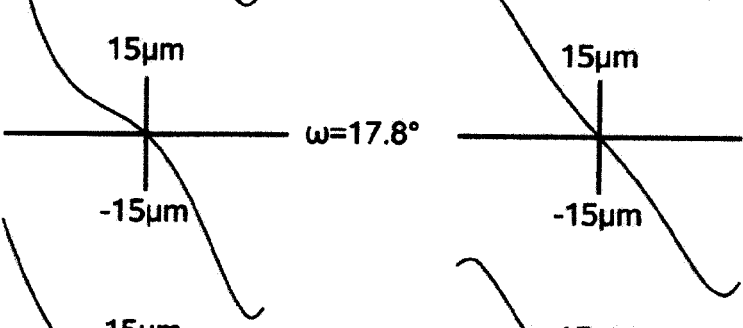
FIG. 19iii  ω=17.8°
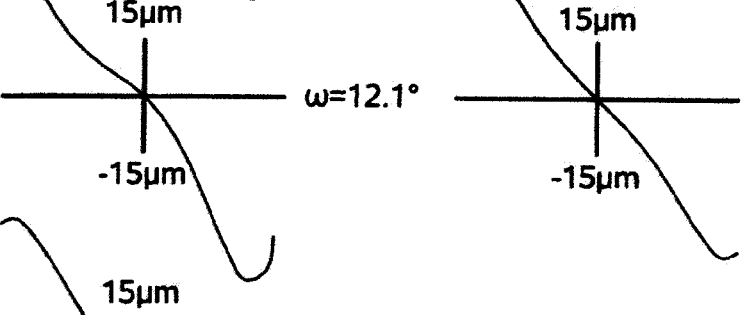
FIG. 19iv  ω=12.1°
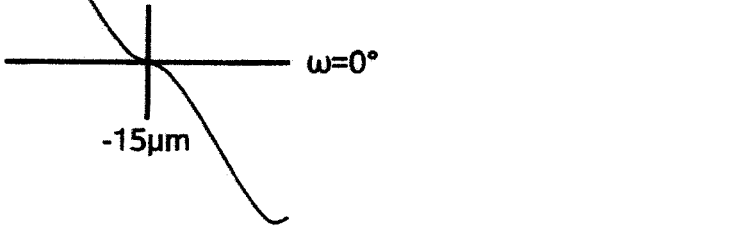
FIG. 19v  ω=0°

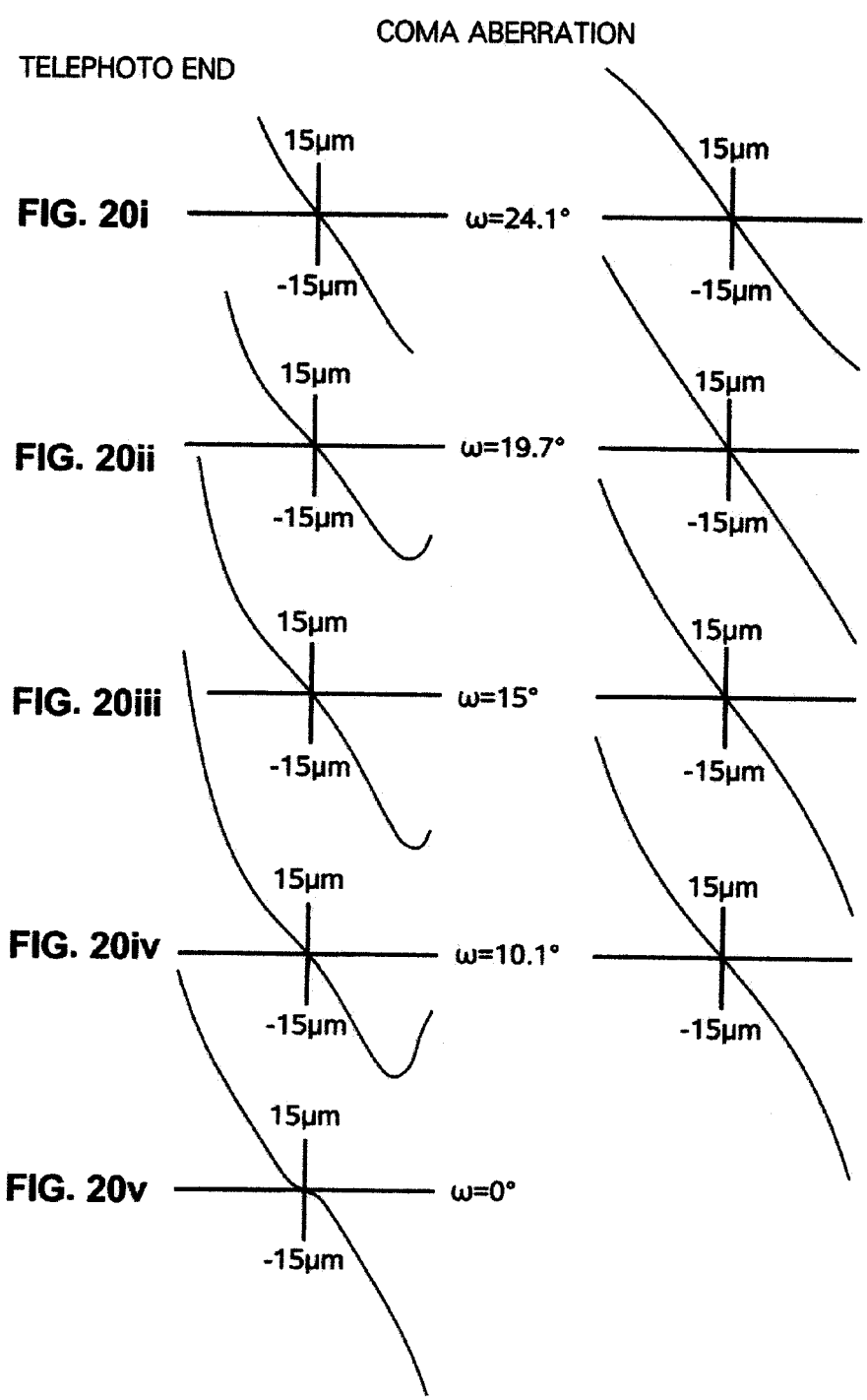

ZOOM LENS FOR PROJECTION AND PROJECTION-TYPE DISPLAY APPARATUS

BACKGROUND OF THE INVENTION

1. Field of the Invention

The present invention relates to a 5-group 8-element zoom lens for projection mountable on a projection-type display apparatus or the like, and to a projection-type display apparatus on which the zoom lens for projection is mounted. In particular, the present invention relates to a zoom lens for projection that magnifies rays of light carrying video information output from a light valve, such as a transmissive or reflective liquid crystal display apparatus and a DMD (digital micromirror device) display apparatus, and projects the magnified rays of light onto a screen. Further, the present invention relates to a projection-type display apparatus on which such a zoom lens for projection is mounted.

2. Description of the Related Art

Projection-type display apparatuses using light valves, such as a liquid crystal display apparatus and a DMD display apparatus, became widely used in recent years. Especially, a projection-type display apparatus using three light valves corresponding to illumination light of RGB primary colors is widely used. The projection-type display apparatus using three light valves modulates the illumination light of three primary colors by the three light valves for respective colors. Further, the modulated light is combined by a prism or the like, and the combined light is projected onto a screen through a projection lens to display an image.

Meanwhile, the sizes of the light valves became small, and the resolutions of the light valves became sharply higher. Further, as personal computers became widely used, a demand for the projection-type display apparatus for use in presentation increased.

Therefore, a projection-type display apparatus having higher performance, a smaller size and a light weight is requested, because such a projection-type display apparatus is conveniently usable, and easily settable. At the same time, a projection lens having a smaller size and a light weight is strongly requested.

As zoom lenses for projection that satisfy such requirements, zoom lenses for projection disclosed, for example, in Japanese Unexamined Patent Publication No. 2004-109896 (Patent Document 1), Japanese Unexamined Patent Publication No. 2004-279958 (Patent Document 2), and Japanese Unexamined Patent Publication No. 2005-156963 (Patent Document 3) are known. The zoom lenses for projection disclosed in Patent Documents 1 through 3 are composed of four or five lens groups, which are seven or eight lenses.

However, in each of the zoom lenses for projection disclosed in Patent Documents 1 through 3, the fourth lens group includes a cemented lens. The use of the cemented lens in the fourth lens group may be advantageous to correction of chromatic aberrations, but it is difficult to correct especially an inclination of an image plane in an excellent manner.

Therefore, the applicant of Japanese Patent Application No. 2010-127440, the priority of which is claimed in this patent application, proposed 5-group zoom lenses for projection in Japanese Unexamined Patent Publication No. 2009-69539 (Patent Document 4) and Japanese Unexamined Patent Publication No. 2009-69540 (Patent Document 5). In Patent Documents 4 and 5, such an inclination of an image plane is corrected in an excellent manner by providing an air lens that functions as a negative lens in a fourth lens group, which is the fourth lens group from the magnification side of the zoom lens.

However, in the zoom lenses for projection disclosed in Patent Documents 4 and 5, a request for more excellent correction of various aberrations increased. Especially, more excellent correction of both spherical aberrations and coma aberrations was requested.

SUMMARY OF THE INVENTION

In view of the foregoing circumstances, it is an object of the present invention to provide a five-group 8-element zoom lens for projection having a smaller size and a lighter weight, and which can correct various aberrations, and especially both of spherical aberrations and coma aberrations in a well-balanced excellent manner. Further, it is another object of the present invention to provide a projection-type display apparatus on which such a zoom lens for projection is mounted.

A zoom lens for projection according to a first aspect of the present invention is a zoom lens for projection comprising:

a first lens group having negative refractive power, and which is composed of two lenses;

a second lens group composed of a positive lens;

an aperture stop;

a third lens group composed of a positive lens;

a fourth lens group composed of three lenses of a fourth-group-first lens, which is a negative lens, a fourth-group-second lens arranged in such a manner that a negative air lens is formed between the fourth-group-first lens and the fourth-group-second lens, and a fourth-group-third lens, which is a positive lens, and the fourth-group-first lens, the fourth-group-second lens and the fourth-group-third lens being arranged in this order from the magnification side of the zoom lens; and a fifth lens group composed of a positive lens having a convex surface facing the magnification side, and the first lens group, the second lens group, the aperture stop, the third lens group, the fourth lens group, and the fifth lens group being arranged from the magnification side in the order mentioned above, wherein the following formula (1) is satisfied:

$$-0.6 < (R_{72}+R_{71})/(R_{72}-R_{71}) < 0.6 \qquad (1), \text{where}$$

$R_{71}$ is a radius of curvature of a magnification-side surface of the fourth-group-third lens, and $R_{72}$ is a radius of curvature of a reduction-side surface of the fourth-group-third lens.

A zoom lens for projection according to a second aspect of the present invention is a zoom lens for projection comprising:

a first lens group having negative refractive power, and which is composed of two lenses;

a second lens group composed of a positive lens;

an aperture stop;

a third lens group composed of a positive lens;

a fourth lens group composed of three lenses of a fourth-group-first lens, which is a negative lens, a fourth-group-second lens arranged in such a manner that a negative air lens is formed between the fourth-group-first lens and the fourth-group-second lens, and a fourth-group-third lens, which is a positive lens, and the fourth-group-first lens, the fourth-group-second lens and the fourth-group-third lens being arranged in this order from the magnification side of the zoom lens; and a fifth lens group composed of a positive lens having a convex surface facing the magnification side, and the first lens group, the second lens group, the aperture stop, the third lens group, the fourth lens group, and the fifth lens group being arranged from the magnification side in the order mentioned above, wherein the following formulas (2) and (3) are satisfied:

$$-0.85<(R_{72}+R_{71})/(R_{72}-R_{71})<0.85 \quad (2); \text{ and}$$

$$-6.0<f_4/f_5 \quad (3), \text{ where}$$

$R_{71}$ is a radius of curvature of a magnification-side surface of the fourth-group-third lens, $R_{72}$ is a radius of curvature of a reduction-side surface of the fourth-group-third lens, $f_4$ is a focal length of the fourth lens group, and $f_5$ is a focal length of the fifth lens group.

A zoom lens for projection according to a third aspect of the present invention is a zoom lens for projection comprising:

a first lens group having negative refractive power, and which is composed of two lenses;

a second lens group composed of a positive lens;

an aperture stop;

a third lens group composed of a positive lens;

a fourth lens group composed of three lenses of a fourth-group-first lens, which is a negative lens, a fourth-group-second lens arranged in such a manner that a negative air lens is formed between the fourth-group-first lens and the fourth-group-second lens, and a fourth-group-third lens, which is a positive lens, and the fourth-group-first lens, the fourth-group-second lens and the fourth-group-third lens being arranged in this order from the magnification side of the zoom lens; and a fifth lens group composed of a positive lens having a convex surface facing the magnification side, and the first lens group, the second lens group, the aperture stop, the third lens group, the fourth lens group, and the fifth lens group being arranged from the magnification side in the order mentioned above, wherein the following formulas (4) and (5) are satisfied:

$$-6.0<\text{fn/fw}<-2.0 \quad (4); \text{ and}$$

$$-11.0<f_4/f_2 \quad (5), \text{ where}$$

fn is a focal length of the negative air lens, fw is a focal length of the entire system of the zoom lens at a wide angle end, $f_2$ is a focal length of the second lens group, and $f_4$ is a focal length of the fourth lens group.

A zoom lens for projection according to a fourth aspect of the present invention is a zoom lens for projection comprising:

a first lens group having negative refractive power, and which is composed of two lenses;

a second lens group composed of a positive lens;

an aperture stop;

a third lens group composed of a positive lens;

a fourth lens group composed of three lenses of a fourth-group-first lens, which is a negative lens, a fourth-group-second lens arranged in such a manner that a negative air lens is formed between the fourth-group-first lens and the fourth-group-second lens, and a fourth-group-third lens, which is a positive lens, and the fourth-group-first lens, the fourth-group-second lens and the fourth-group-third lens being arranged in this order from the magnification side of the zoom lens; and a fifth lens group composed of a positive lens having a convex surface facing the magnification side, and the first lens group, the second lens group, the aperture stop, the third lens group, the fourth lens group, and the fifth lens group being arranged from the magnification side in the order mentioned above, wherein the following formula (6) is satisfied:

$$-24.0<f_4/\text{fw}<-6.0 \quad (6), \text{ where}$$

fw is a focal length of the entire system of the zoom lens at a wide angle end, and $f_4$ is a focal length of the fourth lens group.

In the zoom lens for projection according to any one of aspects of the present invention, it is desirable that at least a surface of the magnification-side lens of the two lenses in the first lens group is aspheric, and that the reduction-side lens of the two lenses in the first lens group has a concave surface facing the reduction side of the zoom lens. Further, it is desirable that the positive lens in the second lens group has a convex surface facing the magnification side, and that the positive lens in the third lens group has a convex surface facing the magnification side. Further, it is desirable that the fourth-group-first lens of the three lenses in the fourth lens group has a concave surface facing the magnification side, and that the fourth-group-third lens of the three lenses in the fourth lens group has a convex surface facing the reduction side.

In the zoom lens for projection according to any one of aspects of the present invention, it is desirable that at least one of the following formulas (7) and (8) is satisfied:

$$3.0<|f_{L4}/\text{fw}| \quad (7); \text{ and}$$

$$-20.0<\text{fn/fw}<-0.5 \quad (8), \text{ where}$$

fw is a focal length of the entire system of the zoom lens at a wide angle end, $f_{L4}$ is a focal length of the magnification-side lens in the first lens group, and fn is a focal length of the negative air lens.

In the zoom lens for projection according to any one of aspects of the present invention, it is desirable that the second lens group, the third lens group, and the fourth lens group move in the direction of an optical axis when magnification is changed.

In this case, it is desirable that the second lens group and the third lens group move as one body when magnification is changed.

Further, when the second lens group and the third lens group are structured in such a manner to move as one body during changing magnification, it is desirable that focusing is performed by moving the first lens group in the direction of an optical axis.

In the zoom lens for projection according to any one of aspects of the present invention, it is desirable that the negative air lens has a double-convex shape.

Further, in the zoom lens for projection according to any one of aspects of the present invention, it is desirable that the fourth lens group includes a lens having at least one aspheric surface.

Further, a projection-type display apparatus of the present invention is a projection-type display apparatus comprising:

a light source;

a light valve;

an illumination optical system that guides rays of light output from the light source to the light valve; and a zoom lens for projection according to any one of aspects of the present invention, wherein the light valve optically modulates the rays of light output from the light source, and wherein the zoom lens for projection projects the modulated rays of light onto a screen.

The term "magnification side" refers to a projected-side (screen side), and for convenience, the screen side is called as a magnification side also in reduction projection. Further, the term "reduction side" refers to an original image display area side (light valve side), and for convenience, the light valve side is called as a reduction side also in reduction projection.

The zoom lenses for projection according to the first through fourth aspects of the present invention and the projection-type display apparatuses using the zoom lenses for projection have specific structures that make the following actions and effects are achievable.

Specifically, the zoom lens for projection according to the first aspect of the present invention and the projection-type display apparatus using the zoom lens for projection satisfy the formula (1). Therefore, a relationship between the radii of curvature of the two surfaces of the fourth-group-third lens in the fourth lens group is regulated in a predetermined range. Consequently, it is possible to correct various aberrations, such as coma aberrations and spherical aberrations, in an excellent manner.

Further, the zoom lens for projection according to the second aspect of the present invention and the projection-type display apparatus using the zoom lens for projection satisfy the formula (2). Therefore, a relationship between the radii of curvature of the two surfaces of the fourth-group-third lens in the fourth lens group is regulated in a predetermined range. Consequently, it is possible to correct various aberrations, such as coma aberrations and spherical aberrations, in an excellent manner. At the same time, the zoom lens for projection according to the second aspect of the present invention and the projection-type display apparatus using the zoom lens for projection satisfy the formula (3). Therefore, a relationship between the power of the fourth lens group and the power of the fifth lens group is regulated in a predetermined range. Especially, when the fourth lens group has negative power, the power of the fifth lens group is controlled at a predetermined value or lower. Therefore, all aberrations are corrected in an excellent manner.

Further, the zoom lens for projection according to the third aspect of the present invention and the projection-type display apparatus using the zoom lens for projection satisfy the formula (4). Therefore, the power of the air lens formed between the fourth-group-first lens and the fourth-group-second lens is regulated in a predetermined range. Consequently, it is possible to correct aberrations, especially aberrations related to an image plane in the sagittal direction and coma aberrations, in an excellent manner. At the same time, the zoom lens for projection according to the third aspect of the present invention and the projection-type display apparatus using the zoom lens for projection satisfy the formula (5). Therefore, the power of the fifth lens group does not become too strong. Consequently, all aberrations are corrected in an excellent manner.

Further, the zoom lens for projection according to the fourth aspect of the present invention and the projection-type display apparatus using the zoom lens for projection satisfy the formula (6). Therefore, the power of the fourth lens group is regulated in a predetermined range, and that is advantageous to correction of various aberrations. Further, it is possible to reduce the size of the projection-type display apparatus, and to increase the angle of view of the zoom lens for projection.

Further, in the zoom lenses for projection according to the first through fourth aspects of the present invention and the projection-type display apparatuses using the zoom lenses, the zoom lens for projection is composed of five lens groups, which are eight lenses. The simple structure of the zoom lens for projection makes it possible to easily reduce the size and the weight of the zoom lens and those of the projection-type display apparatus. Further, the fourth lens group is composed of three lenses of the fourth-group-first lens, the fourth-group-second lens and the fourth-group-third lens, and a negative air lens is formed between the fourth-group-first lens and the fourth-group-second lens. Therefore, it is possible to correct various aberrations, such as an inclination of an image plane, by adjusting the shape of the air lens.

BRIEF DESCRIPTION OF THE DRAWINGS

FIG. 5 is a schematic diagram illustrating the structure of a zoom lens for projection in Example 5 of the present invention at a wide angle end (WIDE) and a telephoto end (TELE);

FIGS. 6Ai, 6Aii, 6Aiii and 6Aiv are diagrams illustrating various aberrations (spherical aberration, astigmatism, distortion, and lateral chromatic aberration, respectively) of the zoom lens for projection in Example 1 at a wide angle end (WIDE);

FIGS. 6Bi, 6Bii, 6Biii and 6Biv are diagrams illustrating various aberrations (spherical aberration, astigmatism, distortion, and lateral chromatic aberration, respectively) of the zoom lens for projection in Example 1 at a telephoto end (TELE);

FIGS. 7$i$, 7$ii$, 7$iii$, 7$iv$ and 7$v$ are diagrams illustrating coma aberrations of the zoom lens for projection in Example 1 at a wide angle end (WIDE);

FIGS. 8$i$, 8$ii$, 8$iii$, 8$iv$ and 8$v$ are diagrams illustrating coma aberrations of the zoom lens for projection in Example 1 at a telephoto end (TELE);

FIGS. 9Ai, 9Aii, 9Aiii and 9Aiv are diagrams illustrating various aberrations (spherical aberration, astigmatism, distortion, and lateral chromatic aberration, respectively) of the zoom lens for projection in Example 2 at a wide angle end (WIDE);

FIGS. 9Bi, 9Bii, 9Biii and 9Biv are diagrams illustrating various aberrations (spherical aberration, astigmatism, distortion, and lateral chromatic aberration, respectively) of the zoom lens for projection in Example 2 at a telephoto end (TELE);

FIGS. 10$i$, 10$ii$, 10$iii$, 10$iv$ and 10$v$ are diagrams illustrating coma aberrations of the zoom lens for projection in Example 2 at a wide angle end (WIDE);

FIGS. 11$i$, 11$ii$, 11$iii$, 11$iv$ and 11$v$ are diagrams illustrating coma aberrations of the zoom lens for projection in Example 2 at a telephoto end (TELE);

FIGS. 12Ai, 12Aii, 12Aiii and 12Aiv are diagrams illustrating various aberrations (spherical aberration, astigmatism, distortion, and lateral chromatic aberration, respectively) of the zoom lens for projection in Example 3 at a wide angle end (WIDE);

FIGS. 12Bi, 12Bii, 12Biii and 12Biv are diagrams illustrating various aberrations (spherical aberration, astigmatism, distortion, and lateral chromatic aberration, respectively) of the zoom lens for projection in Example 3 at a telephoto end (TELE);

FIGS. 13i, 13ii, 13iii, 13iv and 13v are diagrams illustrating coma aberrations of the zoom lens for projection in Example 3 at a wide angle end (WIDE);

FIGS. 15A1, 15Aii, 15Aiii and 15Aiv are diagrams illustrating various aberrations (spherical aberration, astigmatism, distortion, and lateral chromatic aberration, respectively) of the zoom lens for projection in Example 4 at a wide angle end (WIDE);

FIGS. 15Bi, 15Bii, 15Biii and 15Biv are diagrams illustrating various aberrations (spherical aberration, astigmatism, distortion, and lateral chromatic aberration, respectively) of the zoom lens for projection in Example 4 at a telephoto end (TELE);

FIGS. 16i, 16ii, 16iii, 16iv and 16v are diagrams illustrating coma aberrations of the zoom lens for projection in Example 4 at a wide angle end (WIDE);

FIGS. 18Ai, 18Aii, 18Aiii and 18Aiv are diagrams illustrating various aberrations (spherical aberration, astigmatism, distortion, and lateral chromatic aberration, respectively) of the zoom lens for projection in Example 5 at a wide angle end (WIDE);

FIGS. 18Bi, 18Bii, 18Biii and 18Biv are diagrams illustrating various aberrations (spherical aberration, astigmatism, distortion, and lateral chromatic aberration, respectively) of the zoom lens for projection in Example 5 at a telephoto end (TELE);

FIGS. 19i, 19ii, 19iii, 19iv and 19v are diagrams illustrating coma aberrations of the zoom lens for projection in Example 5 at a wide angle end (WIDE);

FIGS. 20i, 20ii, 20iii, 20iv and 20v are diagrams illustrating coma aberrations of the zoom lens for projection in Example 5 at a telephoto end (TELE)

DESCRIPTION OF THE PREFERRED EMBODIMENTS

Figure 1:
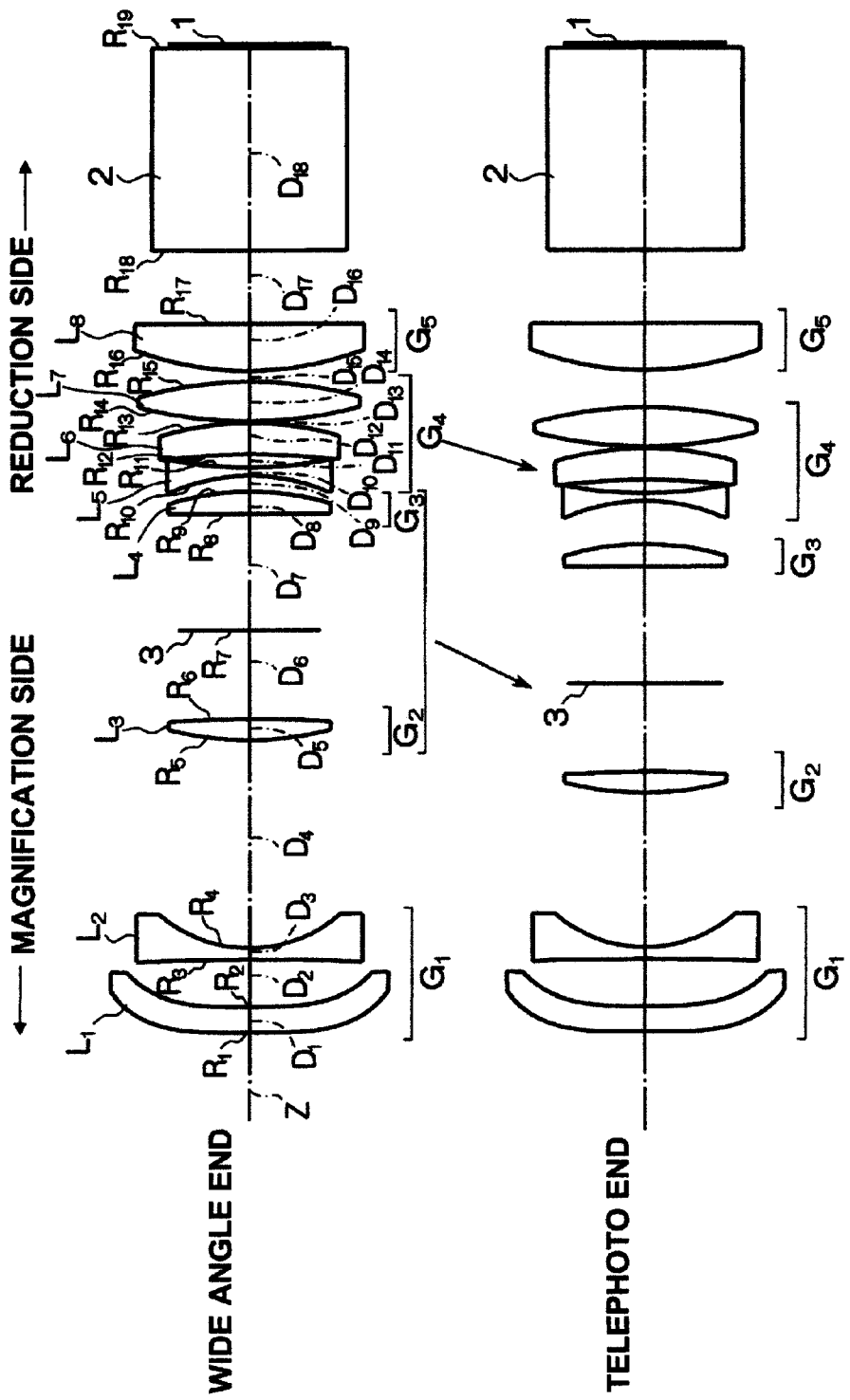
FIG. 1 is a schematic diagram illustrating the structure of a zoom lens for projection in Example 1 of the present invention at a wide angle end (WIDE) and a telephoto end (TELE)

Hereinafter, embodiments of the present invention will be described with reference to drawings. FIG. 1 illustrates a zoom lens for projection according to an embodiment of the present invention (a zoom lens for projection in Example 1 is used as an example). The zoom lens for projection illustrated in FIG. 1 is composed of first lens group $G_1$ having negative refractive power, and which is composed of two lenses, second lens group $G_2$ composed of a positive lens, an aperture stop 3, third lens group $G_3$ composed of a positive lens, fourth lens group $G_4$ composed of three lenses of a fourth-group-first lens (lens $L_5$ in FIG. 1), which is a negative lens, a fourth-group-second lens (lens $L_6$ in FIG. 1) arranged in such a manner that a negative air lens is formed between the fourth-group-first lens (lens $L_5$) and the fourth-group-second lens (lens $L_6$), and a fourth-group-third lens (lens $L_7$ in FIG. 1), which is a positive lens, and the fourth-group-first lens, the fourth-group-second lens and the fourth-group-third lens (lenses $L_5$, $L_6$, $L_7$) being arranged in this order from the magnification side of the zoom lens, and fifth lens group $G_5$ composed of a positive lens having a convex surface facing the magnification side. The first lens group $G_1$, the second lens group $G_2$, the aperture stop 3, the third lens group $G_3$, the fourth lens group $G_4$, and the fifth lens group $G_5$ are arranged from the magnification side in the order mentioned above. Further, the reduction side of the zoom lens for projection is telecentric. A glass block (including a filter portion) 2, which is mainly a color combination prism, and an image display plane 1 of a light valve, such as a liquid crystal display panel, are arranged on the downstream side of the zoom lens for projection. In FIG. 1, line Z represents an optical axis.

In Examples 1 through 5, the lens groups $G_1$ through $G_5$ are basically structured as described below. Specifically, the first lens group $G_1$ is composed of first lens $L_1$ and second lens $L_2$, which are arranged in this order from the magnification side of the zoom lens for projection. The first lens $L_1$ is an aspheric lens (made of plastic), and at least a surface of the first lens $L_1$ is aspheric. The second lens $L_2$ is a negative lens having a concave surface facing the reduction side of the zoom lens for projection. The second lens group $G_2$ consists of third lens $L_3$, in other words, the second lens group $G_2$ is composed of only third lens $L_3$. The third lens $L_3$ is a positive lens having a convex surface facing the magnification side. The third lens group $G_3$ consists of fourth lens $L_4$, in other words, the third lens group $G_3$ is composed of only fourth lens $L_4$. The fourth lens $L_4$ is a positive lens having a convex surface facing the magnification side. The fourth lens group $G_4$ is composed of three lenses of fifth lens $L_5$, sixth lens $L_6$, and seventh lens $L_7$, which are arranged in this order from the magnification side. The fifth lens $L_5$ is a negative lens having a concave surface facing the magnification side. The sixth lens $L_6$ is arranged in such a manner that a negative air lens is formed between the fifth lens $L_5$ and the sixth lens $L_6$. The seventh lens $L_7$ is a positive lens having a convex surface facing the reduction side. The fourth lens group $G_4$, as a whole, has positive refractive power (Example 5) or negative refractive power (Examples 1 through 4). It is desirable that the fourth lens group $G_4$ includes a lens having at least an aspheric surface. Aberrations are corrected in an excellent manner by an aspheric lens having a small lens diameter. Further, the fifth lens group $G_5$ consists of eighth lens $L_8$, in other words, the fifth lens group $G_5$ is composed of only eighth lens $L_8$. The eighth lens $L_8$ is a positive lens having a convex surface facing the magnification side. Since the zoom lens for projection is structured in this manner, a negative air lens (double-convex shape in the following examples) Ln is formed between the fifth lens $L_5$ and the sixth lens $L_6$ in the fourth lens group $G_4$.

Since the negative air lens Ln is formed between the fifth lens $L_5$ and the sixth lens $L_6$ in the fourth lens group $G_4$, it is possible to correct an inclination of an image plane.

When the negative air lens Ln has a double-convex shape, the correction function of the negative air lens Ln is further improved.

Further, it is desirable that the third lens group $G_3$ and the aperture stop 3 (a mask may be used) move as one body during zooming (corresponding to Examples 1 through 5).

As described above, the zoom lens for projection according to an embodiment of the present invention is a so-called negative-lead-type zoom lens. Therefore, it is possible to easily increase the projection angle, and to ensure an appropriate length of back focus.

Further, the zoom function of the zoom lens for projection according to an embodiment of the present invention is achievable by moving three lens groups (in Examples 1 through 5, the second lens group $G_2$, the third lens group $G_3$, and the fourth lens group $G_4$) in the direction of an optical axis when magnification is changed. Since the three lens groups, namely, the second lens group $G_2$, the third lens group $G_3$, and the fourth lens group $G_4$ are movable lens groups, aberrations are corrected in a more excellent manner. In this case, when the second lens group $G_2$ and the third lens group $G_3$ move as one body, it is possible to simplify a drive mechanism of the zoom lens for projection. Further, it is possible to correct aberrations in a more excellent manner.

Further, it is desirable that all of the movable lens groups move toward the magnification side when magnification is changed from a wide angle end to a telephoto end. In the embodiment of the present invention, it is possible to set a higher variable magnification ratio by structuring the zoom lens for projection in such a manner.

This means that the position of each of the movable lens groups at a telephoto end is set on the magnification side of the position of the respective movable lens groups at a wide angle end. Therefore, any of the movable lens groups may temporarily move to the reduction side in a middle range of variable magnification.

Further, it is desirable that focusing is performed by moving the first lens group $G_1$ in the direction of the optical axis. Alternatively, a different lens group may be moved for focusing.

A zoom lens for projection according to a first embodiment of the present invention satisfies the following formula (1):

$$-0.6 < (R_{72}+R_{71})/(R_{72}-R_{71}) < 0.6 \quad (1),\text{where}$$

$R_{71}$ is a radius of curvature of a magnification-side surface of the seventh lens $L_7$ (fourth-group-third lens), and $R_{72}$ is a radius of curvature of a reduction-side surface of the seventh lens $L_7$ (fourth-group-third lens).

Further, a zoom lens for projection according to a second embodiment of the present invention satisfies the following formulas (2) and (3):

$$-0.85 < (R_{72}+R_{71})/(R_{72}-R_{71}) < 0.85 \quad (2);\text{ and}$$

$$-6.0 < f_4/f_5 \quad (3),\text{where}$$

$R_{71}$ is a radius of curvature of a magnification-side surface of the seventh lens $L_7$ (fourth-group-third lens), $R_{72}$ is a radius of curvature of a reduction-side surface of the seventh lens $L_7$ (fourth-group-third lens), $f_4$ is a focal length of the fourth lens group $G_4$, and $f_5$ is a focal length of the fifth lens group $G_5$.

Further, a zoom lens for projection according to a third embodiment of the present invention satisfies the following formulas (4) and (5):

$$-6.0 < fn/fw < -2.0 \quad (4);\text{ and}$$

$$-11.0 < f_4/f_2 \quad (5),\text{where}$$

fn is a focal length of negative air lens Ln, fw is a focal length of the entire system of the zoom lens at a wide angle end, $f_2$ is a focal length of the second lens group $G_2$, and $f_4$ is a focal length of the fourth lens group $G_4$.

Further, a zoom lens for projection according to a fourth embodiment of the present invention satisfies the following formula (6):

$$-24.0 < f_4/fw < -6.0 \quad (6),\text{where}$$

fw is a focal length of the entire system of the zoom lens at a wide angle end, and $f_4$ is a focal length of the fourth lens group $G_4$.

Further, in any one of the embodiments of the present invention, it is desirable that at least one of the following formulas (7) and (8) is satisfied:

$$-3.0 < f_{L4}/fw \quad (7);\text{ and}$$

$$-20.0 < fn/fw < -0.5 \quad (8),\text{where}$$

fw is a focal length of the entire system of the zoom lens at a wide angle end, $f_{L4}$ is a focal length of the first lens $L_1$ in the first lens group $G_1$, and fn is a focal length of negative air lens Ln.

Next, the technical meanings of the formulas (1) through (8) will be described.

In the formulas (1) and (2), the sum of the radii of curvature of the two surfaces of the seventh lens $L_7$, which is the most-reduction-side lens in the fourth lens group $G_4$, is divided by the difference between the radii of curvature of the two surfaces of the seventh lens $L_7$. The formulas (1) and (2) define conditions for correcting spherical aberrations and coma aberrations in an excellent manner. Specifically, when the value of $(R_{72}+R_{71})/(R_{72}-R_{71})$ exceeds the upper limit defined by the formula (1) or (2), coma aberrations become worse. When the value of $(R_{72}+R_{71})/(R_{72}-R_{71})$ is lower than the lower limit defined by the formula (1) or (2), spherical aberrations become worse.

Therefore, it is more desirable that the following formula (1') is satisfied instead of the formula (1):

$$-0.2 < (R_{72}+R_{71})/(R_{72}-R_{71}) < 0.2 \quad (1').$$

Further, it is even more desirable that the following formula (1") is satisfied:

$$-0.1 < (R_{72}+R_{71})/(R_{72}-R_{71}) < 0.1 \quad (1'').$$

In the formula (3), the focal length of the fourth lens group $G_4$ is divided by the focal length of the fifth lens group $G_5$. The formula (3) defines the range of the value of $f_4/f_5$ for correcting aberrations, as a whole, in an excellent manner. Specifically, when the value of $f_4/f_5$ is lower than the lower limit defined by the formula (3), the power of the fifth lens group $G_5$ becomes too strong, and it becomes difficult to correct aberrations, as a whole, in an excellent manner.

Further, the formula (4) defines the range of the power of the air lens that can correct aberrations in an excellent manner. Specifically, when the value of fn/fw is lower is lower than the lower limit defined by the formula (4), it becomes difficult to correct aberrations, especially, curvature of field in sagittal direction. When the value of fn/fw exceeds the upper limit defined by the formula (4), it becomes difficult to correct aberrations, especially, coma aberrations.

Therefore, it is desirable that the following formula (4') is satisfied instead of the formula (4):

$$-5.0 < fn/fw < -2.0 \quad (4').$$

In the formula (5), the focal length of the fourth lens group $G_4$ is divided by the focal length of the second lens group $G_2$. The formula (5) defines the range of the value of $f_4/f_2$ for correcting aberrations, as a whole, in an excellent manner. Specifically, when the value of $f_4/f_2$ is lower than the lower limit defined by the formula (5), the power of the second lens group $G_2$ becomes too strong, and it becomes difficult to correct aberrations, as a whole, in an excellent manner.

Therefore, it is more desirable that the following formula (5') is satisfied instead of the formula (5):

$$-8.0 < f_4/f_2 < 0.0 \quad (5').$$

Further, it is even more desirable that the following formula (5") is satisfied:

$$-7.0 < f_4/f_2 < -3.0 \quad (5").$$

Further, the formula (6) defines the power of the fourth lens group $G_4$. The formula (6) defines conditions to be applied when the fourth lens group $G_4$ has negative power. When the value of $f_4/fw$ is lower than the lower limit defined by the formula (6), the power of the fourth lens group $G_4$ is too strong, and it becomes difficult to correct aberrations. When the value of $f_4/fw$ exceeds the upper limit defined by the formula (6), the power of the fourth lens group $G_4$ is too weak, and it becomes difficult to widen the angle of view.

Therefore, it is desirable that the following formula (6') is satisfied instead of the formula (6):

$$-15.0 < f_4/fw < -7.0 \quad (6').$$

Further, the formula (7) defines the power of the first lens $L_1$, which is the magnification-side lens in the first lens group $G_1$. The formula (7) defines conditions for correction aberrations, as a whole, in an excellent manner. Specifically, when the value of $|f_{L4}/fw|$ is lower than the lower limit defined by the formula (7), the power of the first lens $L_1$, which is an aspheric lens, becomes strong. Especially, when the aspheric lens is made of plastic, a fluctuation of aberrations caused by a fluctuation of temperature becomes excessive.

Therefore, it is more desirable that the following formula (7') is satisfied instead of the Formula (7):

$$5.0 < |f_{L4}/fw| < 20.0 \quad (7').$$

Further, it is even more desirable that the following formula (7") is satisfied:

$$7.0 < |f_{L4}/fw| < 15.0 \quad (7").$$

Further, the formula (8) defines the power of the air lens Ln in the fourth lens group $G_4$. The formula (8) defines conditions for correcting especially coma aberration and sagittal flare in an excellent manner. Specifically, when the value of fn/fw is lower than the lower limit defined by the formula (8), it becomes difficult to correct sagittal flare. When the value of fn/fw exceeds the upper limit defined by the formula (8), it becomes difficult to correct coma aberrations.

Therefore, it is more desirable that the following formula (8') is satisfied instead of the formula (8):

$$-10.0 < fn/fw < -1.0 \quad (8').$$

Further, it is even more desirable that the following formula (8") is satisfied:

$$-5.0 < fn/fw < -2.0 \quad (8").$$

In each of the following examples, the zoom lens for projection includes an aspheric lens. The shape of the aspheric surface of the aspheric lens is represented by the following aspheric surface equation:

[EQUATION 1]

$$Z = \frac{Y^2/R}{1 + \sqrt{1 - K \times Y^2/R^2}} + \sum_{i=3}^{10} A_i Y^i, \quad \text{where}$$

Z: length of a perpendicular from a point on an aspheric surface, the point away from an optical axis by distance Y, to flat plane (flat plane perpendicular to the optical axis) in contact with the vertex of the aspheric surface, Y: distance from the optical axis, R: a radius of curvature of the aspheric surface in the vicinity of the optical axis, K: eccentricity, and $A_i$: aspheric coefficient (i=3 through 10).

Figure 21:
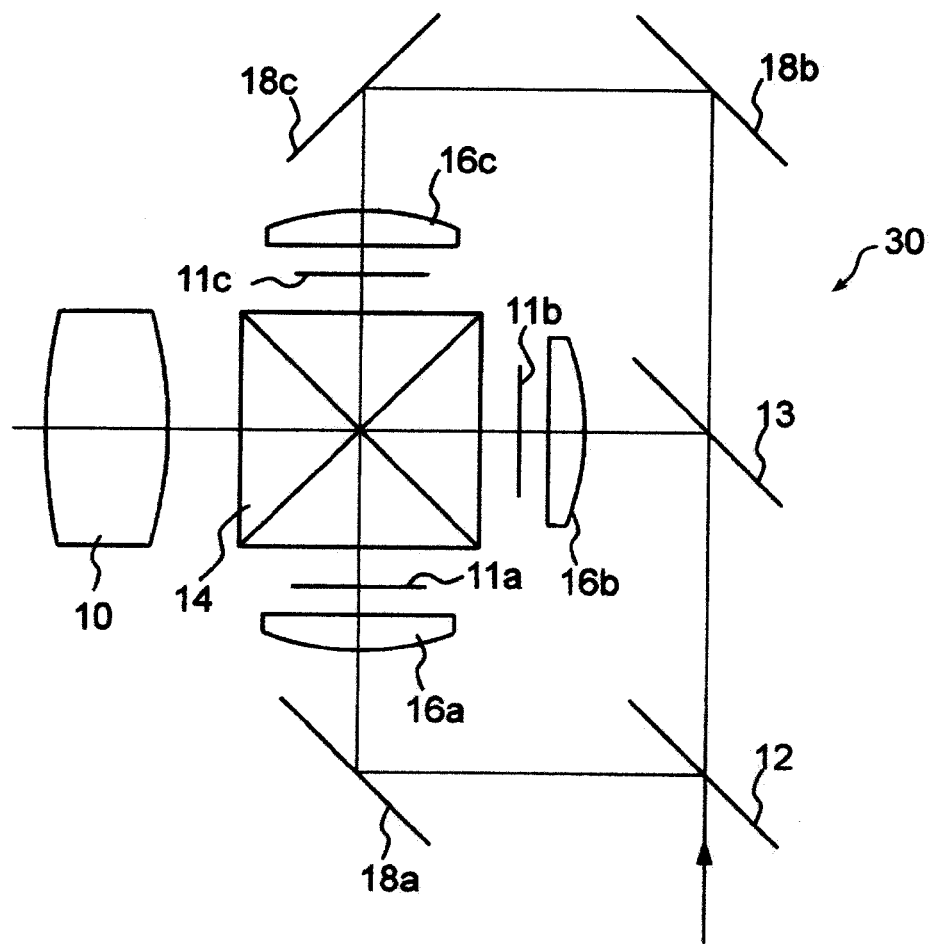
FIG. 21 is a schematic diagram illustrating the configuration of a projection-type display apparatus according to an embodiment of the present invention.

Next, with reference to FIG. 21, an example of a projection-type display apparatus on which the aforementioned zoom lens for projection is mounted will be described. A projection-type display apparatus 30, illustrated in FIG. 21, includes transmissive liquid crystal panels 11a, 11b, 11c, as light valves. The projection-type display apparatus 30 uses, as the zoom lens 10 for projection, the zoom lens for projection according to the aforementioned embodiments of the present invention. Further, an integrator (not illustrated), such as a fly's eye integrator, is arranged between a light source 15 and a dichroic mirror 12. White light output from the light source 15 enters, through an illumination optical unit, liquid crystal panels 11a through 11c, which correspond to rays of light of three colors (G light, B light and R right), respectively, and is optically modulated. The modulated light of three colors is combined together by a cross dichroic prism 14, and projected onto a screen, which is not illustrated, by the zoom lens 10 for projection. The projection-type display apparatus 30 includes dichroic mirrors 12, 13 for separating colors, a cross-dichroic prism 14 for combining colors, and condenser lenses 16a, 16b, 16c, and total reflection mirrors 18a, 18b, 18c. Since the projection-type display apparatus according to an embodiment of the present invention uses the zoom lens for projection according to an embodiment of the present invention, it is possible to reduce the size, the weight and the production cost of the apparatus while achieving high variable magnification. Further, it is possible to maintain high optical performance.

It is not necessary that the zoom lens for projection of the present invention is used as a zoom lens for projection in a projection-type display apparatus using transmissive liquid crystal panels or the like. The zoom lens for projection of the present invention may be used as a zoom lens for projection in an apparatus using a different light modulation means, such as reflective liquid crystal display panels and a DMD.

EXAMPLES

The zoom lens for projection of the present invention will be further described by using specific examples.

Example 1

As described already, the zoom lens for projection in Example 1 is structured as illustrated in FIG. 1. Specifically, the zoom lens for projection in Example 1 is composed of first lens group $G_1$ having negative refractive power, second lens group $G_2$, an aperture stop 3, third lens group $G_3$, fourth lens group $G_4$ having negative refractive power, and fifth lens group $G_5$, which are arranged in this order from the magnification side of the zoom lens for projection. The first lens group $G_1$ is composed of first lens $L_1$ and second lens $L_2$, which are arranged in this order from the magnification side. The first lens $L_1$ is an aspheric lens (made of plastic), and both surfaces of the first lens $L_1$ are aspheric. The second lens $L_2$ is a double-concave lens. The second lens group $G_2$ consists of third lens $L_3$, which is a double-convex lens, in other words, the second lens group $G_2$ is composed of only the third lens $L_3$. The third lens group $G_3$ consists of fourth lens $L_4$, which is a double-convex lens. The fourth lens group $G_4$ is composed of three lenses of fifth lens $L_5$, sixth lens $L_6$ and seventh lens $L_7$, which are arranged in this order from the magnification side. The fifth lens $L_5$ is a double-concave lens. The sixth lens $L_6$ is arranged in such a manner that negative air lens (double-convex shape) Ln is formed between the fifth lens $L_5$ and the sixth lens $L_6$. The sixth lens $L_6$ has a positive meniscus shape having a concave surface facing the magnification side. The seventh lens $L_7$ is a double-convex lens. The fifth lens group $G_5$ consists of eighth lens $L_8$, which is a plano-convex lens having a convex surface facing the magnification side. Further, the reduction side of the zoom lens for projection is telecentric. A glass block (including a filter portion) 2, which is mainly a color combination prism, and an image display plane 1 of a light valve, such as a liquid crystal display panel, are arranged on the downstream side of the zoom lens for projection. In FIG. 1, line Z represents an optical axis.

When magnification is changed, the second lens group $G_2$, the third lens group $G_3$ and the fourth lens group $G_4$ move toward the magnification side during zooming from a wide angle end to a telephoto end. Further, the second lens group $G_2$ and the third lens group $G_3$ move as one body. Further, the aperture stop 3 also moves together with the second lens group $G_2$ and the third lens group $G_3$, as one body. Further, a mask may be arranged together with the aperture stop 3, instead of arranging the aperture stop 3 alone.

Further, focusing is performed by moving the first lens group $G_1$ in the direction of the optical axis Z.

The upper section of Table 1 shows the radius of curvature R (mm) of each lens surface in Example 1, the center thickness of each lens and air space between lenses D (mm), and refractive index $N_d$ and the Abbe number $v_d$ of each lens for d-line. In Table 1 and Tables 2 through 6, which will be described later, surface numbers corresponding to the values of R, D, $N_d$, and $v_d$ sequentially increase from the magnification side.

Further, the top line of Table 1 shows focal length f, back focus Bf, Fno. (F-number), and angle 2ω of view (same for Tables 2 through 6, which will be described later).

Further, the middle section of Table 1 shows variable distance 1 (a distance between the first lens group $G_1$ and the second lens group $G_2$), variable distance 2 (a distance between the third lens group $G_3$ and the fourth lens group $G_4$), and variable distance 3 (a distance between the fourth lens group $G_4$ and the fifth lens group $G_5$) at a wide angle end (wide) and at a telephoto end (tele) (same for Tables 2 through 6, which will be described later). Further, the bottom section of Table 1 shows the values of coefficients K, $A_3$ through $A_{10}$ corresponding to each aspheric surface (same for Tables 2 through 6, which will be described later).

TABLE 1 f = 19.28~23.14, Bf = 26.53, Fno = 2.0~2.2, 2ω = 56.4°~48.4°

| SURFACE NUMBER S | CURVATURE OF RADIUS R | DISTANCE D | REFRACTIVE INDEX $N_d$ | ABBE NUMBER $v_d$ |
|---|---|---|---|---|
| *1 | −505.465 | 3.30 | 1.491000 | 57.6 |
| *2 | 228.339 | 6.00 | | |
| 3 | −360.055 | 1.50 | 1.487490 | 70.5 |
| 4 | 17.190 | D1 | | |
| 5 | 41.315 | 2.69 | 1.772500 | 49.6 |
| 6 | −159.515 | 11.40 | | |
| 7 | ∞ (STOP) | 14.98 | | |
| 8 | 6819.474 | 2.87 | 1.713000 | 53.9 |
| 9 | −35.618 | D2 | | |
| 10 | −24.429 | 1.00 | 1.761820 | 26.6 |
| 11 | 50.961 | 1.74 | | |
| 12 | −80.651 | 4.06 | 1.713000 | 53.9 |
| 13 | −38.386 | 0.20 | | |
| 14 | 53.722 | 5.10 | 1.603110 | 60.6 |
| 15 | −51.070 | D3 | | |
| 16 | 40.284 | 5.98 | 1.603110 | 60.6 |
| 17 | ∞ | 9.40 | | |

TABLE 1-continued f = 19.28~23.14, Bf = 26.53, Fno = 2.0~2.2, 2ω = 56.4°~48.4°

| SURFACE NUMBER S | CURVATURE OF RADIUS R | DISTANCE D | REFRACTIVE INDEX $N_d$ | ABBE NUMBER $v_d$ |
|---|---|---|---|---|
| 18 | ∞ | 26.00 | 1.516330 | 64.1 |
| 19 | ∞ | | | |

*ASPHERIC SURFACE

| | | |
|---|---|---|
| PROJECTION DISTANCE | 1.8 m | inf |
| D1 (WIDE ANGLE END) | 26.73 | 26.25 |
| D2 (WIDE ANGLE END) | 2.09 | 2.09 |
| D3 (WIDE ANGLE END) | 1.40 | 1.40 |
| D1 (TELEPHOTO END) | 19.84 | 19.37 |
| D2 (TELEPHOTO END) | 5.59 | 5.59 |
| D3 (TELEPHOTO END) | 4.79 | 4.79 |

ASPHERIC COEFFICIENT

| | FIRST SURFACE | SECOND SURFACE |
|---|---|---|
| K | −1.7620037E+03 | −1.0512480E+04 |
| $A_3$ | 0.0000000E+00 | 0.0000000E+00 |
| $A_4$ | 1.3719124E−05 | 1.6303474E−04 |
| $A_5$ | 2.4610669E−05 | −1.3420518E−05 |
| $A_6$ | −4.1057965E−06 | 1.0043368E−06 |
| $A_7$ | 3.0940196E−07 | −1.0977478E−07 |
| $A_8$ | −1.0868151E−08 | 1.1220476E−08 |
| $A_9$ | 1.0507902E−10 | −6.0191177E−10 |
| $A_{10}$ | 2.1134006E−12 | 1.2789507E−11 |

Further, Table 6 shows numerical values corresponding to the aforementioned formulas in Example 1.

FIGS. 6Ai, 6Aii, 6Aiii and 6Aiv are diagrams illustrating various aberrations (spherical aberration, astigmatism, distortion, and lateral chromatic aberration, respectively) of the zoom lens for projection in Example 1 at a wide angle end (WIDE). FIGS. 6Bi, 6Bii, 6Biii and 6Biv are diagrams illustrating various aberrations (spherical aberration, astigmatism, distortion, and lateral chromatic aberration, respectively) of the zoom lens for projection in Example 1 at a telephoto end (TELE). FIGS. 7i, 7ii, 7iii, 7iv and 7v are diagrams illustrating coma aberrations of the zoom lens for projection in Example 1 at a wide angle end (WIDE). FIGS. 8i, 8ii, 8iii, 8iv and 8v are diagrams illustrating coma aberrations of the zoom lens for projection in Example 1 at a telephoto end (TELE). In FIGS. 6Ai through 6Aiv and 6Bi through 6Biv, and in FIGS. 9Ai through 9Aiv and 9Bi through 9Biv, FIGS. 12A1 through 12Aiv and 12Bi through 12Biv, FIGS. 15Ai through 15Aiv and 15Bi through 15Biv, and FIGS. 18A1 through 18Aiv and 18Bi through 18Biv, which will be described later, diagrams of spherical aberrations illustrate aberrations for light with wavelengths of 550 nm, 460 nm, and 620 nm. Further, diagrams of astigmatism illustrate aberrations with respect to a sagittal image plane and a tangential image plane. Further, diagrams of lateral chromatic aberrations illustrate aberrations for light with wavelengths of 460 nm and 620 nm with respect to light with a wavelength of 550 nm.

As FIGS. 6Ai through By clearly illustrate, the zoom lens for projection in Example 1 has angle 2ω of view of 56.4 degrees, which is wide, at a wide angle end. Further, F-number is 2.0, which means the zoom lens is a fast lens. Further, various aberrations are corrected in an excellent manner.

Further, as Table 6 shows, the zoom lens for projection in Example 1 satisfies the formulas (1) through (8), (1'), (4') through (8'), (1"), (5"), (7") and (8").

Example 2

Figure 2:
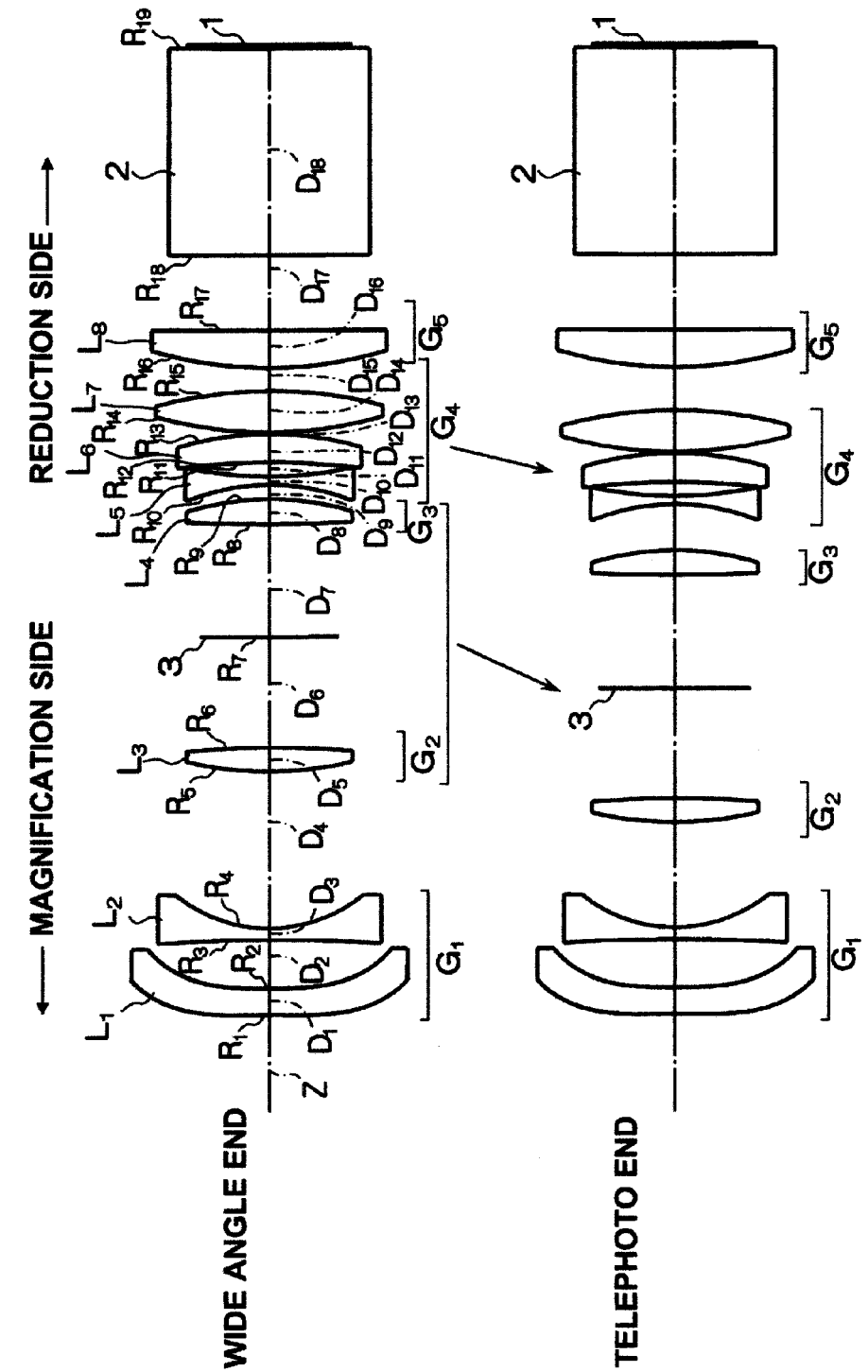
FIG. 2 is a schematic diagram illustrating the structure of a zoom lens for projection in Example 2 of the present invention at a wide angle end (WIDE) and a telephoto end (TELE)

FIG. 2 is a schematic diagram illustrating the structure of a zoom lens for projection in Example 2. The structure of the zoom lens for projection in Example 2 is substantially the same as the structure of the zoom lens for projection in Example 1.

Table 2 shows the radius of curvature R (mm) of each lens surface in Example 2, the center thickness of each lens and air space between lenses D (mm), and refractive index $N_d$ and the Abbe number $v_d$ of each lens for d-line.

TABLE 2 f = 19.24~23.08, Bf = 26.53, Fno = 2.0~2.2 , 2ω = 56.8°~48.6°

| SURFACE NUMBER S | CURVATURE OF RADIUS R | DISTANCE D | REFRACTIVE INDEX $N_d$ | ABBE NUMBER $v_d$ |
|---|---|---|---|---|
| *1 | −207.390 | 3.30 | 1.491000 | 57.6 |
| *2 | 116.869 | 6.00 | | |
| 3 | −231.524 | 1.50 | 1.487490 | 70.5 |
| 4 | 17.977 | D1 | | |
| 5 | 43.672 | 3.00 | 1.804000 | 46.6 |
| 6 | −134.308 | 13.80 | | |
| 7 | ∞ (STOP) | 14.16 | | |
| 8 | 229.055 | 3.11 | 1.772500 | 49.6 |
| 9 | −34.782 | D2 | | |
| 10 | −26.582 | 1.00 | 1.805180 | 25.5 |
| 11 | 48.234 | 1.77 | | |
| 12 | −84.316 | 3.56 | 1.651600 | 58.4 |
| 13 | −39.206 | 0.20 | | |
| 14 | 50.922 | 5.22 | 1.603110 | 60.6 |
| 15 | −53.033 | D3 | | |
| 16 | 50.066 | 4.62 | 1.772500 | 49.6 |
| 17 | ∞ | 9.40 | | |
| 18 | ∞ | 26.00 | 1.516330 | 64.1 |
| 19 | ∞ | | | |

*ASPHERIC SURFACE

| PROJECTION DISTANCE | 1.8 m | inf |
|---|---|---|
| D1 (WIDE ANGLE END) | 19.75 | 19.36 |
| D2 (WIDE ANGLE END) | 1.84 | 1.84 |
| D3 (WIDE ANGLE END) | 2.87 | 2.87 |
| D1 (TELEPHOTO END) | 13.27 | 12.88 |
| D2 (TELEPHOTO END) | 5.78 | 5.78 |
| D3 (TELEPHOTO END) | 5.42 | 5.42 |

| ASPHERIC COEFFICIENT | | |
|---|---|---|
| | FIRST SURFACE | SECOND SURFACE |
| K | 6.8213016E+01 | −1.9372647E+03 |
| $A_3$ | 0.0000000E+00 | 0.0000000E+00 |
| $A_4$ | 2.0178895E−05 | 2.2171121E−04 |
| $A_5$ | 2.6731485E−05 | −1.8938151E−05 |
| $A_6$ | −4.3101145E−06 | 1.1561858E−06 |
| $A_7$ | 3.0912949E−07 | −8.6677277E−08 |
| $A_8$ | −1.0593519E−08 | 8.1802045E−09 |
| $A_9$ | 1.1801826E−10 | −4.6195734E−10 |
| $A_{10}$ | 1.2731821E−12 | 1.0731464E−11 |

Further, Table 6 shows numerical values corresponding to the aforementioned formulas in Example 2.

FIGS. 9Ai, 9Aii, 9Aiii and 9Aiv are diagrams illustrating various aberrations (spherical aberration, astigmatism, distortion, and lateral chromatic aberration, respectively) of the zoom lens for projection in Example 2 at a wide angle end (WIDE). FIGS. 9Bi, 9Bii, 9Biii and 9Biv are diagrams illustrating various aberrations (spherical aberration, astigmatism, distortion, and lateral chromatic aberration, respectively) of the zoom lens for projection in Example 2 at a telephoto end (TETE). FIGS. 10i, 10ii, 10iii, 10iv and 10v are diagrams illustrating coma aberrations of the zoom lens for projection in Example 2 at a wide angle end (WIDE). FIGS. 11i, 11ii, 11iii, 11iv and 11v are diagrams illustrating coma aberrations of the zoom lens for projection in Example 2 at a telephoto end (TELE).

As FIGS. 9Ai through 11v clearly illustrate, the zoom lens for projection in Example 2 has angle 2ω of view of 56.8 degrees, which is wide, at a wide angle end. Further, F-number is 2.0, which means the zoom lens is a fast lens. Further, various aberrations are corrected in an excellent manner.

Further, as Table 6 shows, the zoom lens for projection in Example 2 satisfies the formulas (1) through (8), (1'), (4') through (8'), (1"), (5"), (7") and (8").

Example 3

Figure 3:
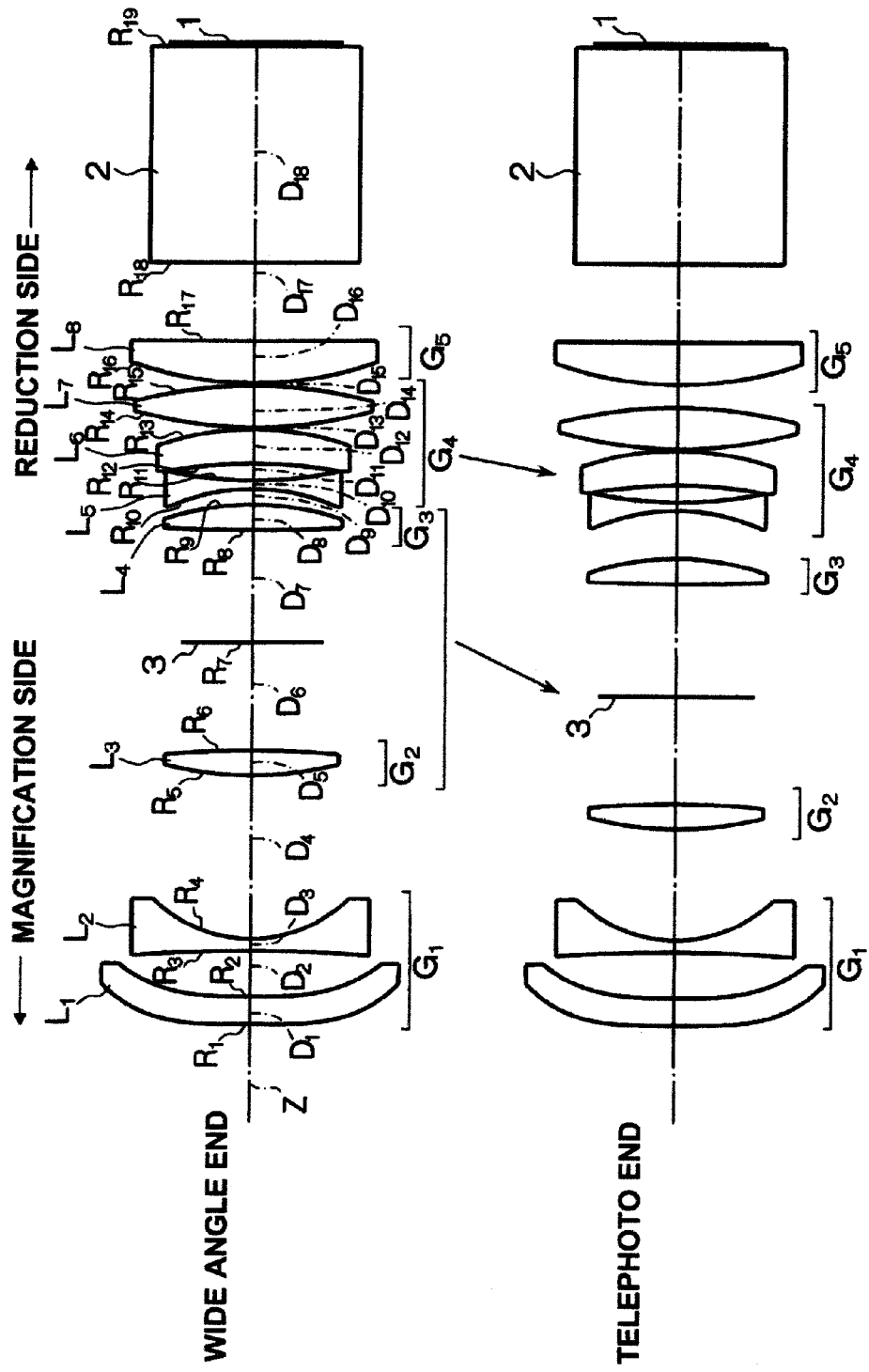
FIG. 3 is a schematic diagram illustrating the structure of a zoom lens for projection in Example 3 of the present invention at a wide angle end (WIDE) and a telephoto end (TELE)

FIG. 3 is a schematic diagram illustrating the structure of a zoom lens for projection in Example 3. The structure of the zoom lens for projection in Example 3 is substantially the same as the structure of the zoom lens for projection in Example 1.

Table 3 shows the radius of curvature R (mm) of each lens surface in Example 3, the center thickness of each lens and air space between lenses D (mm), and refractive index $N_d$ and the Abbe number $v_d$ of each lens for d-line.

TABLE 3 f = 19.23~23.07, Bf = 26.53, Fno = 2.0~2.2 , 2ω = 56.4°~48.2°

| SURFACE NUMBER S | CURVATURE OF RADIUS R | DISTANCE D | REFRACTIVE INDEX $N_d$ | ABBE NUMBER $v_d$ |
|---|---|---|---|---|
| *1 | −1004.556 | 3.30 | 1.491000 | 57.6 |
| *2 | 149.556 | 5.47 | | |
| 3 | −193.403 | 1.50 | 1.487490 | 70.5 |
| 4 | 16.117 | D1 | | |
| 5 | 40.485 | 3.03 | 1.772500 | 49.6 |
| 6 | −117.131 | 12.95 | | |
| 7 | ∞ (STOP) | 13.53 | | |
| 8 | 255.797 | 3.07 | 1.713000 | 53.9 |
| 9 | −31.957 | D2 | | |
| 10 | −24.029 | 1.00 | 1.761820 | 26.6 |
| 11 | 48.535 | 2.04 | | |
| 12 | −59.303 | 4.18 | 1.713000 | 53.9 |
| 13 | −33.383 | 0.20 | | |
| 14 | 49.993 | 5.04 | 1.603110 | 60.6 |
| 15 | −54.026 | D3 | | |
| 16 | 42.929 | 5.10 | 1.603110 | 60.6 |
| 17 | ∞ | 9.40 | | |

TABLE 3-continued f = 19.23~23.07, Bf = 26.53, Fno = 2.0~2.2, 2ω = 56.4°~48.2°

| SURFACE NUMBER S | CURVATURE OF RADIUS R | DISTANCE D | REFRACTIVE INDEX $N_d$ | ABBE NUMBER $v_d$ |
|---|---|---|---|---|
| 18 | ∞ | 26.00 | 1.516330 | 64.1 |
| 19 | ∞ | | | |

*ASPHERIC SURFACE

| PROJECTION DISTANCE | 1.8 m | inf |
|---|---|---|
| D1 (WIDE ANGLE END) | 19.81 | 19.42 |
| D2 (WIDE ANGLE END) | 1.89 | 1.89 |
| D3 (WIDE ANGLE END) | 0.30 | 0.30 |
| D1 (TELEPHOTO END) | 13.53 | 13.14 |
| D2 (TELEPHOTO END) | 5.75 | 5.75 |
| D3 (TELEPHOTO END) | 2.72 | 2.72 |

ASPHERIC COEFFICIENT

| | FIRST SURFACE | SECOND SURFACE |
|---|---|---|
| K | −9.6872740E+30 | −4.2145832E+03 |
| $A_3$ | 0.0000000E+00 | 0.0000000E+00 |
| $A_4$ | 9.0728410E−06 | 1.8341354E−04 |
| $A_5$ | 2.7015636E−05 | −1.4609365E−05 |
| $A_6$ | −4.3088183E−06 | 9.5801488E−07 |
| $A_7$ | 3.0895978E−07 | −1.0971530E−07 |
| $A_8$ | −1.0597122E−08 | 1.1078358E−08 |
| $A_9$ | 1.2616519E−10 | −5.5073312E−10 |
| $A_{10}$ | 7.8581631E−13 | 1.0038880E−11 |

Further Table 6 shows numerical values corresponding to the aforementioned formulas in Example 3.

Figure 14I:
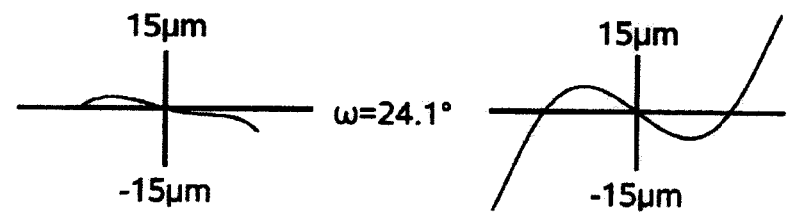
FIGS. 14i, 14ii, 14iii, 14iv and 14v are diagrams illustrating coma aberrations of the zoom lens for projection in Example 3 at a telephoto end (TELE)
Figure 14I:
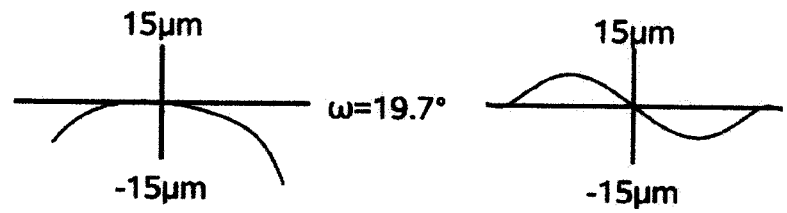
Figure 14I:
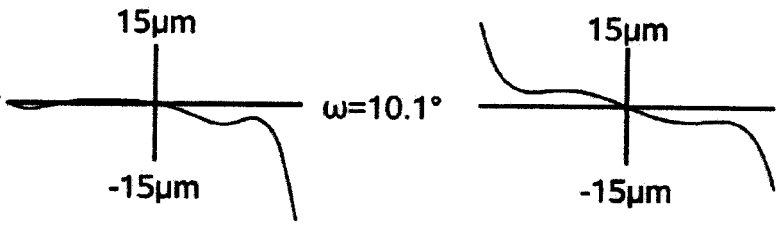
Figure 14V:
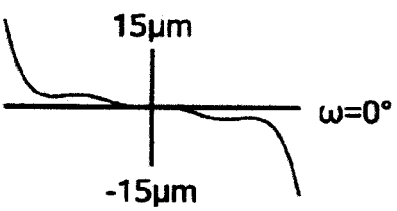

FIGS. 12Ai, 12Aii, 12Aiii and 12Aiv are diagrams illustrating various aberrations (spherical aberration, astigmatism, distortion, and lateral chromatic aberration, respectively) of the zoom lens for projection in Example 3 at a wide angle end (WIDE). FIGS. 12Bi, 12Bii, 12Biii and 12Biv are diagrams illustrating various aberrations (spherical aberration, astigmatism, distortion, and lateral chromatic aberration, respectively) of the zoom lens for projection in Example 3 at a telephoto end (TELE). FIGS. 13i, 13ii, 13iii, 13iv and 13v are diagrams illustrating coma aberrations of the zoom lens for projection in Example 3 at a wide angle end (WIDE). FIGS. 14i, 14ii, 14iii, 14iv and 14v are diagrams illustrating coma aberrations of the zoom lens for projection in Example 3 at a telephoto end (TELE).

As FIGS. 12Ai through 14v clearly illustrate, the zoom lens for projection in Example 3 has angle 2ω of view of 56.4 degrees, which is wide, at a wide angle end. Further, F-number is 2.0, which means the zoom lens is a fast lens. Further, various aberrations are corrected in an excellent manner.

Further, as Table 6 shows, the zoom lens for projection in Example 3 satisfies the formulas (1) through (8), (1'), (4') through (8'), (1"), (5"), (7") and (8").

Example 4

Figure 4:
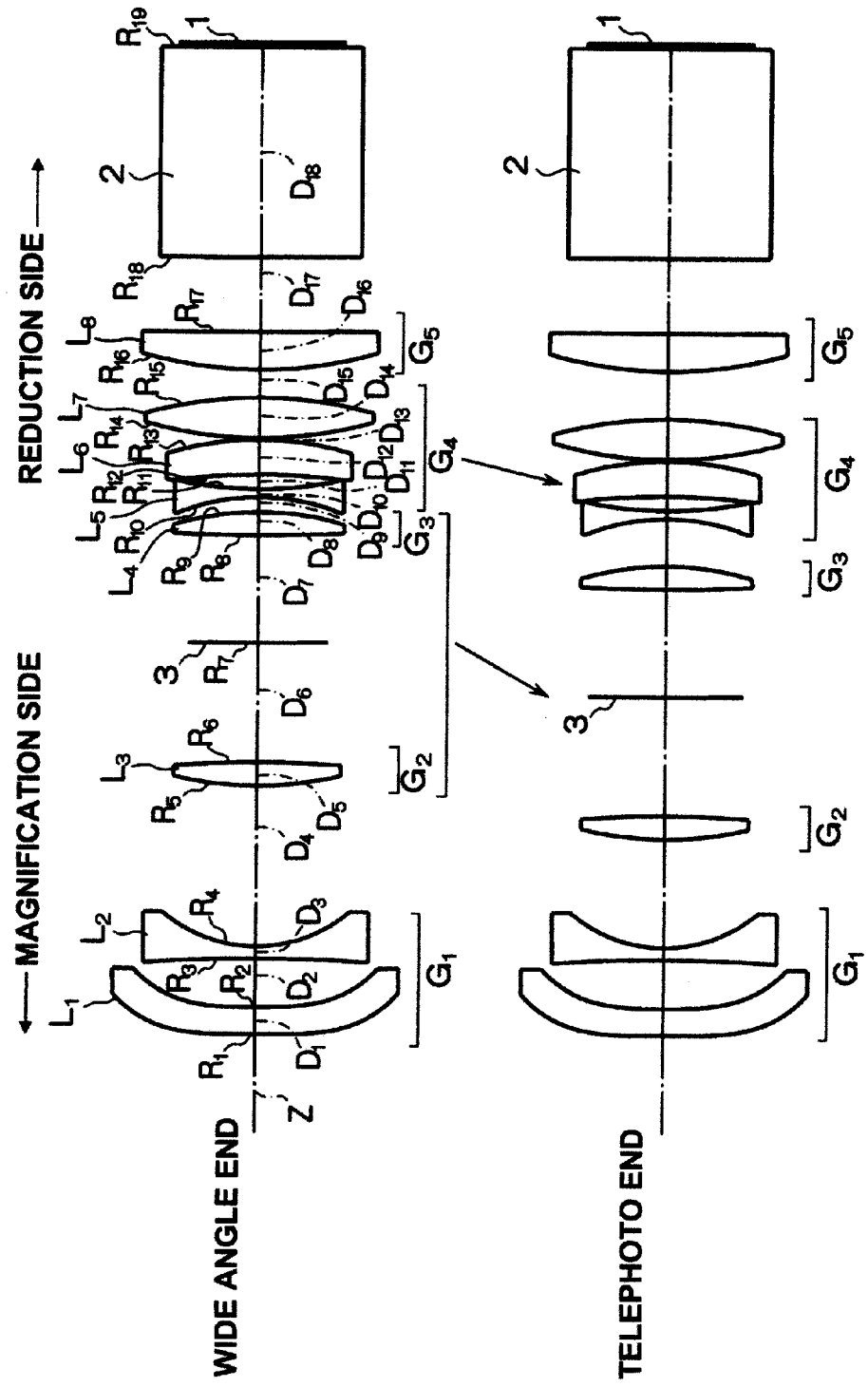
FIG. 4 is a schematic diagram illustrating the structure of a zoom lens for projection in Example 4 of the present invention at a wide angle end (WIDE) and a telephoto end (TELE)

FIG. 4 is a schematic diagram illustrating the structure of a zoom lens for projection in Example 4. The structure of the zoom lens for projection in Example 4 is substantially the same as the structure of the zoom lens for projection in Example 3.

Table 4 shows the radius of curvature R (mm) of each lens surface in Example 4, the center thickness of each lens and air space between lenses D (mm), and refractive index $N_d$ and the Abbe number $v_d$ of each lens for d-line.

TABLE 4 f = 19.23~23.07, Bf = 26.53, Fno = 2.0~2.2, 2ω = 56.4°~48.8°

| SURFACE NUMBER S | CURVATURE OF RADIUS R | DISTANCE D | REFRACTIVE INDEX $N_d$ | ABBE NUMBER $v_d$ |
|---|---|---|---|---|
| *1 | −278.832 | 3.30 | 1.491000 | 57.6 |
| *2 | 107.895 | 6.00 | | |
| 3 | −193.634 | 1.50 | 1.487490 | 70.5 |
| 4 | 17.525 | D1 | | |
| 5 | 43.400 | 2.91 | 1.804000 | 46.6 |
| 6 | −126.361 | 14.70 | | |
| 7 | ∞ (STOP) | 13.28 | | |
| 8 | 201.278 | 2.88 | 1.772500 | 49.6 |
| 9 | −35.488 | D2 | | |
| 10 | −26.427 | 1.00 | 1.805180 | 25.5 |
| 11 | 47.016 | 1.83 | | |
| 12 | −80.491 | 4.33 | 1.651600 | 58.4 |
| 13 | −38.243 | 0.20 | | |
| 14 | 50.665 | 5.03 | 1.603110 | 60.6 |
| 15 | −52.649 | D3 | | |
| 16 | 52.241 | 4.67 | 1.772500 | 49.6 |
| 17 | ∞ | 9.40 | | |
| 18 | ∞ | 26.00 | 1.516330 | 64.1 |
| 19 | ∞ | | | |

*ASPHERIC SURFACE

| PROJECTION DISTANCE | 1.8 m | inf |
|---|---|---|
| D1 (WIDE ANGLE END) | 19.97 | 19.60 |
| D2 (WIDE ANGLE END) | 1.84 | 1.84 |
| D3 (WIDE ANGLE END) | 3.47 | 3.47 |
| D1 (TELEPHOTO END) | 13.51 | 13.14 |
| D2 (TELEPHOTO END) | 5.81 | 5.81 |
| D3 (TELEPHOTO END) | 5.96 | 5.96 |

ASPHERIC COEFFICIENT

| | FIRST SURFACE | SECOND SURFACE |
|---|---|---|
| K | −2.4365795E+02 | −1.6780505E+03 |
| $A_3$ | 0.0000000E+00 | 0.0000000E+00 |
| $A_4$ | 2.1552841E−05 | 2.3368610E−04 |
| $A_5$ | 2.6828305E−05 | −2.0138680E−05 |
| $A_6$ | −4.3609858E−06 | 1.1824020E−06 |
| $A_7$ | 3.0986776E−07 | −8.4953727E−08 |
| $A_8$ | −1.0318899E−08 | 7.5546931E−09 |
| $A_9$ | 1.0364030E−10 | −3.9020287E−10 |
| $A_{10}$ | 1.4210073E−12 | 8.0244434E−12 |

Further, Table 6 shows numerical values corresponding to the aforementioned formulas in Example 4.

Figure 17I:
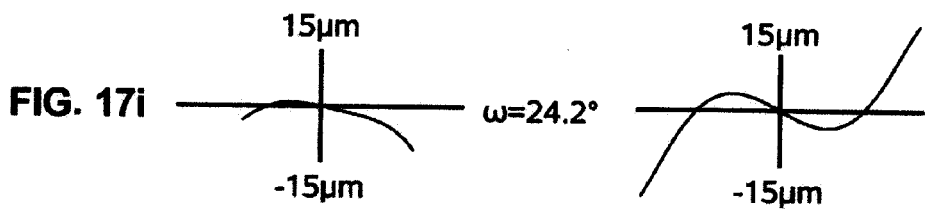
FIGS. 17i, 17ii, 17iii, 17iv and 17v are diagrams illustrating coma aberrations of the zoom lens for projection in Example 4 at a telephoto end (TELE)
Figure 17I:
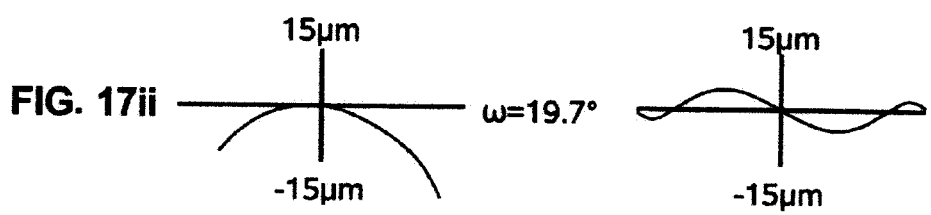
Figure 17I:
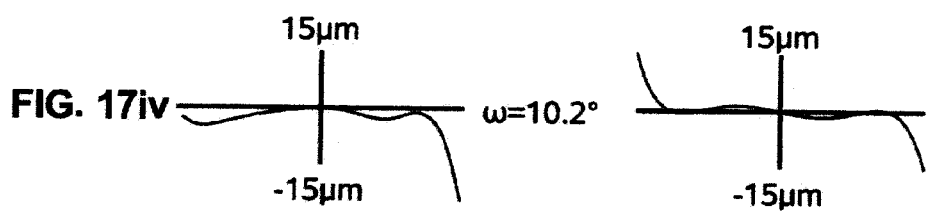
Figure 17V:
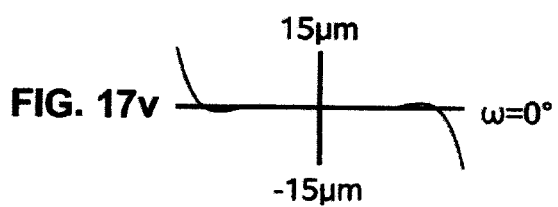

FIGS. 15Ai, 15Aii, 15Aiii and 15Aiv are diagrams illustrating various aberrations (spherical aberration, astigmatism, distortion, and lateral chromatic aberration, respectively) of the zoom lens for projection in Example 4 at a wide angle end (WIDE). FIGS. 15Bi, 15Bii, 15Biii and 15Biv are diagrams illustrating various aberrations (spherical aberration, astigmatism, distortion, and lateral chromatic aberration, respectively) of the zoom lens for projection in Example 4 at a telephoto end (TELE). FIGS. 16i, 16ii, 16iii, 16iv and 16v are diagrams illustrating coma aberrations of the zoom lens for projection in Example 4 at a wide angle end (WIDE). FIGS. 17i, 17ii, 17iii, 17iv and 17v are diagrams illustrating coma aberrations of the zoom lens for projection in Example 4 at a telephoto end (TELE).

As FIGS. 15Ai through 17v clearly illustrate, the zoom lens for projection in Example 4 has angle 2ω of view of 56.4 degrees, which is wide, at a wide angle end. Further, F-number is 2.0, which means the zoom lens is a fast lens. Further, various aberrations are corrected in an excellent manner.

Further, as Table 6 shows, the zoom lens for projection in Example 4 satisfies the formulas (1) through (8), (1'), (4') through (8'), (1"), (5"), (7") and (8").

Example 5

FIG. 5 is a schematic diagram illustrating the structure of a zoom lens for projection in Example 5. The structure of the zoom lens for projection in Example 5 is substantially the same as the structure of the zoom lens for projection in Example 1. However, the zoom lens for projection in Example 5 differs from Example 1 in that the fourth lens group $G_4$ has positive refractive power.

Table 5 shows the radius of curvature R (mm) of each lens surface in Example 5, the center thickness of each lens and air space between lenses D (mm), and refractive index $N_d$ and the Abbe number $v_d$ of each lens for d-line.

TABLE 5 f = 19.28~23.13, Bf = 26.52, Fno = 2.0~2.3, 2ω = 56.4°~48.2°

| SURFACE NUMBER S | CURVATURE OF RADIUS R | DISTANCE D | REFRACTIVE INDEX $N_d$ | ABBE NUMBER $v_d$ |
|---|---|---|---|---|
| *1 | −100.201 | 3.30 | 1.491000 | 57.6 |
| *2 | 2727.353 | 6.00 | | |
| 3 | −200.448 | 1.50 | 1.487490 | 70.5 |
| 4 | 18.802 | D1 | | |
| 5 | 35.473 | 3.90 | 1.772500 | 49.6 |
| 6 | −147.682 | 19.45 | | |
| 7 | ∞ (STOP) | 6.20 | | |
| 8 | 295.201 | 2.29 | 1.713000 | 53.9 |
| 9 | −37.058 | D2 | | |
| 10 | −16.662 | 1.00 | 1.761820 | 26.6 |
| 11 | 46.266 | 1.97 | | |
| 12 | −51.355 | 3.14 | 1.713000 | 53.9 |
| 13 | −30.724 | 2.13 | | |
| 14 | 114.682 | 7.14 | 1.603110 | 60.6 |
| 15 | −23.048 | D3 | | |
| 16 | 40.818 | 5.06 | 1.603110 | 60.6 |
| 17 | ∞ | 9.40 | | |
| 18 | ∞ | 26.00 | 1.516330 | 64.1 |
| 19 | ∞ | | | |

*ASPHERIC SURFACE

| PROJECTION DISTANCE | 1.8 m | inf |
|---|---|---|
| D1 (WIDE ANGLE END) | 23.18 | 22.74 |
| D2 (WIDE ANGLE END) | 2.63 | 2.63 |
| D3 (WIDE ANLGE END) | 1.33 | 1.33 |
| D1 (TELEPHOTO END) | 16.30 | 15.85 |
| D2 (TELEPHOTO END) | 5.99 | 5.99 |
| D3 (TELEPHOTO END) | 4.86 | 4.86 |

| ASPHERIC COEFFICIENT | | |
|---|---|---|
| | FIRST SURFACE | SECOND SURFACE |
| K | 0.0000000E+00 | 0.0000000E+00 |
| $A_3$ | −1.0594101E−03 | −1.2836607E−03 |
| $A_4$ | 2.2664791E−04 | 3.0461114E−04 |
| $A_5$ | 1.5444042E−06 | −1.3813852E−05 |
| $A_6$ | −2.4215745E−06 | −2.0334357E−07 |
| $A_7$ | 2.2779591E−07 | −1.1434813E−09 |
| $A_8$ | −9.5910974E−09 | 6.0083755E−09 |
| $A_9$ | 1.8249323E−10 | −4.1481971E−10 |
| $A_{10}$ | −1.0203913E−12 | 8.4638822E−12 |

Further, Table 6 shows numerical values corresponding to the aforementioned formulas in Example 5.

FIGS. 18Ai, 18Aii, 18Aiii and 18Aiv are diagrams illustrating various aberrations (spherical aberration, astigmatism, distortion, and lateral chromatic aberration, respectively) of the zoom lens for projection in Example 5 at a wide angle end (WIDE). FIGS. 18Bi, 18Bii, 18Biii and 18Biv are diagrams illustrating various aberrations (spherical aberration, astigmatism, distortion, and lateral chromatic aberration, respectively) of the zoom lens for projection in Example 5 at a telephoto end (TELE). FIGS. 19i, 19ii, 19iii, 19iv and 19v are diagrams illustrating coma aberrations of the zoom lens for projection in Example 5 at a wide angle end (WIDE). FIGS. 20i, 20ii, 20iii, 20iv and 20v are diagrams illustrating coma aberrations of the zoom lens for projection in Example 5 at a telephoto end (TELE).

As FIGS. 18Ai through 20v clearly illustrate, the zoom lens for projection in Example 5 has angle 2ω of view of 56.4 degrees, which is wide, at a wide angle end. Further, F-number is 2.0, which means the zoom lens is a fast lens. Further, various aberrations are corrected in an excellent manner.

Further, as Table 6 shows, the zoom lens for projection in Example 5 satisfies the formulas (2) through (5), (7), (8), (4'), (7'), (8'), (7") and (8").

TABLE 6

| FORMULA | | EXAMPLE 1 | EXAMPLE 2 | EXAMPLE 3 | EXAMPLE 4 | EXAMPLE 5 |
|---|---|---|---|---|---|---|
| (1), (1'), (1"), (2) | $(R_{72} + R_{71})/(R_{72} − R_{71})$ | −0.03 | 0.02 | 0.04 | 0.02 | −0.67 |
| (3) | $f_4/f_5$ | −3.62 | −2.42 | −3.46 | −2.71 | 922.68 |
| (4), (4'), (8), (8'), (8") | fn/fw | −3.68 | −3.46 | −3.15 | −3.35 | −2.87 |
| (5), (5'), (5") | $f_4/f_2$ | −5.66 | −3.81 | −6.28 | −4.53 | 1671.98 |
| (6), (6') | $f_4/fw$ | −12.50 | −8.13 | −12.77 | −9.48 | 3226.03 |
| (7), (7'), (7"), | $|f_{L4}/fw|$ | 16.52 | 7.85 | 13.72 | 8.18 | 10.16 |

What is claimed is:
1. A zoom lens for projection comprising:
a first lens group having negative refractive power, and which is composed of two lenses;
a second lens group composed of a positive lens;
an aperture stop;

a third lens group composed of a positive lens;

a fourth lens group composed of three lenses of a fourth-group-first lens, which is a negative lens, a fourth-group-second lens arranged in such a manner that a negative air lens is formed between the fourth-group-first lens and the fourth-group-second lens, and a fourth-group-third lens, which is a positive lens, and the fourth-group-first lens, the fourth-group-second lens and the fourth-group-third lens being arranged in this order from the magnification side of the zoom lens; and a fifth lens group composed of a positive lens having a convex surface facing the magnification side, and the first lens group, the second lens group, the aperture stop, the third lens group, the fourth lens group, and the fifth lens group being arranged from the magnification side in the order mentioned above, wherein the following formula (1) is satisfied:

$$-0.6 < (R_{72}+R_{71})/(R_{72}-R_{71}) < 0.6 \quad (1), \text{where}$$

$R_{71}$ is a radius of curvature of a magnification-side surface of the fourth-group-third lens, and $R_{72}$ is a radius of curvature of a reduction-side surface of the fourth-group-third lens.

2. A zoom lens for projection, as defined in claim 1, wherein at least a surface of the magnification-side lens of the two lenses in the first lens group is aspheric, and wherein the reduction-side lens of the two lenses in the first lens group has a concave surface facing the reduction side of the zoom lens, and wherein the positive lens in the second lens group has a convex surface facing the magnification side, and wherein the positive lens in the third lens group has a convex surface facing the magnification side, and wherein the fourth-group-first lens of the three lenses in the fourth lens group has a concave surface facing the magnification side, and wherein the fourth-group-third lens of the three lenses in the fourth lens group has a convex surface facing the reduction side.

3. A zoom lens for projection, as defined in claim 1, wherein the following formula (7) is satisfied:

$$3.0 < |f_{L4}/fw| \quad (7), \text{where}$$

fw is a focal length of the entire system of the zoom lens at a wide angle end, and $f_{L4}$ is a focal length of the magnification-side lens in the first lens group.

4. A zoom lens for projection, as defined in claim 1, wherein the following formula (8) is satisfied:

$$-20.0 < fn/fw < -0.5 \quad (8), \text{where}$$

fw is a focal length of the entire system of the zoom lens at a wide angle end, and fn is a focal length of the negative air lens.

5. A projection-type display apparatus comprising:

a light source;

a light valve;

an illumination optical system that guides rays of light output from the light source to the light valve; and a zoom lens for projection, as defined in claim 1, wherein the light valve optically modulates the rays of light output from the light source, and wherein the zoom lens for projection projects the modulated rays of light onto a screen.

6. A zoom lens for projection comprising:

a first lens group having negative refractive power, and which is composed of two lenses;

a second lens group composed of a positive lens;

an aperture stop;

a third lens group composed of a positive lens;

a fourth lens group composed of three lenses of a fourth-group-first lens, which is a negative lens, a fourth-group-second lens arranged in such a manner that a negative air lens is formed between the fourth-group-first lens and the fourth-group-second lens, and a fourth-group-third lens, which is a positive lens, and the fourth-group-first lens, the fourth-group-second lens and the fourth-group-third lens being arranged in this order from the magnification side of the zoom lens; and a fifth lens group composed of a positive lens having a convex surface facing the magnification side, and the first lens group, the second lens group, the aperture stop, the third lens group, the fourth lens group, and the fifth lens group being arranged from the magnification side in the order mentioned above, wherein the following formulas (2) and (3) are satisfied:

$$-0.85 < (R_{72}+R_{71})/(R_{72}-R_{71}) < 0.85 \quad (2); \text{and}$$

$$-6.0 < f_4/f_5 \quad (3), \text{where}$$

$R_{71}$ is a radius of curvature of a magnification-side surface of the fourth-group-third lens, $R_{72}$ is a radius of curvature of a reduction-side surface of the fourth-group-third lens, $f_4$ is a focal length of the fourth lens group, and $f_5$ is a focal length of the fifth lens group.

7. A zoom lens for projection, as defined in claim 6, wherein at least a surface of the magnification-side lens of the two lenses in the first lens group is aspheric, and wherein the reduction-side lens of the two lenses in the first lens group has a concave surface facing the reduction side of the zoom lens, and wherein the positive lens in the second lens group has a convex surface facing the magnification side, and wherein the positive lens in the third lens group has a convex surface facing the magnification side, and wherein the fourth-group-first lens of the three lenses in the fourth lens group has a concave surface facing the magnification side, and wherein the fourth-group-third lens of the three lenses in the fourth lens group has a convex surface facing the reduction side.

8. A zoom lens for projection, as defined in claim 6, wherein the following formula (7) is satisfied:

$$3.0 < |f_{L4}/fw| \quad (7), \text{where}$$

fw is a focal length of the entire system of the zoom lens at a wide angle end, and $f_{L4}$ is a focal length of the magnification-side lens in the first lens group.

9. A zoom lens for projection, as defined in claim 6, wherein the following formula (8) is satisfied:

$$-20.0 < fn/fw < -0.5 \quad (8), \text{where}$$

fw is a focal length of the entire system of the zoom lens at a wide angle end, and fn is a focal length of the negative air lens.

10. A projection-type display apparatus comprising:

a light source;

a light valve;

an illumination optical system that guides rays of light output from the light source to the light valve; and a zoom lens for projection, as defined in claim 6, wherein the light valve optically modulates the rays of light output from the light source, and wherein the zoom lens for projection projects the modulated rays of light onto a screen.

11. A zoom lens for projection comprising:
a first lens group having negative refractive power, and which is composed of two lenses;
a second lens group composed of a positive lens;
an aperture stop;
a third lens group composed of a positive lens;
a fourth lens group composed of three lenses of a fourth-group-first lens, which is a negative lens, a fourth-group-second lens arranged in such a manner that a negative air lens is formed between the fourth-group-first lens and the fourth-group-second lens, and a fourth-group-third lens, which is a positive lens, and the fourth-group-first lens, the fourth-group-second lens and the fourth-group-third lens being arranged in this order from the magnification side of the zoom lens; and
a fifth lens group composed of a positive lens having a convex surface facing the magnification side, and the first lens group, the second lens group, the aperture stop, the third lens group, the fourth lens group, and the fifth lens group being arranged from the magnification side in the order mentioned above,
wherein the following formulas (4) and (5) are satisfied:

$$-6.0 < fn/fw < -2.0 \quad (4); \text{ and}$$

$$-11.0 < f_4/f_2 \quad (5), \text{ where}$$

fn is a focal length of the negative air lens,
fw is a focal length of the entire system of the zoom lens at a wide angle end,
$f_2$ is a focal length of the second lens group, and
$f_4$ is a focal length of the fourth lens group.

12. A zoom lens for projection, as defined in claim 11,
wherein at least a surface of the magnification-side lens of the two lenses in the first lens group is aspheric, and
wherein the reduction-side lens of the two lenses in the first lens group has a concave surface facing the reduction side of the zoom lens, and
wherein the positive lens in the second lens group has a convex surface facing the magnification side, and
wherein the positive lens in the third lens group has a convex surface facing the magnification side, and
wherein the fourth-group-first lens of the three lenses in the fourth lens group has a concave surface facing the magnification side, and
wherein the fourth-group-third lens of the three lenses in the fourth lens group has a convex surface facing the reduction side.

13. A zoom lens for projection, as defined in claim 11, wherein the following formula (7) is satisfied:

$$3.0 < |f_{L4}/fw| \quad (7), \text{ where}$$

fw is a focal length of the entire system of the zoom lens at a wide angle end, and
$f_{L4}$ is a focal length of the magnification-side lens in the first lens group.

14. A zoom lens for projection, as defined in claim 11, wherein the following formula (8) is satisfied:

$$-20.0 < fn/fw < -0.5 \quad (8), \text{ where}$$

fw is a focal length of the entire system of the zoom lens at a wide angle end, and
fn is a focal length of the negative air lens.

15. A projection-type display apparatus comprising:
a light source;
a light valve;
an illumination optical system that guides rays of light output from the light source to the light valve; and
a zoom lens for projection, as defined in claim 11,
wherein the light valve optically modulates the rays of light output from the light source, and
wherein the zoom lens for projection projects the modulated rays of light onto a screen.

16. zoom lens for projection comprising:
a first lens group having negative refractive power, and which is composed of two lenses;
a second lens group composed of a positive lens;
an aperture stop;
a third lens group composed of a positive lens;
a fourth lens group composed of three lenses of a fourth-group-first lens, which is a negative lens, a fourth-group-second lens arranged in such a manner that a negative air lens is formed between the fourth-group-first lens and the fourth-group-second lens, and a fourth-group-third lens, which is a positive lens, and the fourth-group-first lens, the fourth-group-second lens and the fourth-group-third lens being arranged in this order from the magnification side of the zoom lens; and
a fifth lens group composed of a positive lens having a convex surface facing the magnification side, and the first lens group, the second lens group, the aperture stop, the third lens group, the fourth lens group, and the fifth lens group being arranged from the magnification side in the order mentioned above,
wherein the following formula (6) is satisfied:

$$-24.0 < f_4/fw < -6.0 \quad (6), \text{ where}$$

fw is a focal length of the entire system of the zoom lens at a wide angle end, and
$f_4$ is a focal length of the fourth lens group.

17. A zoom lens for projection, as defined in claim 16,
wherein at least a surface of the magnification-side lens of the two lenses in the first lens group is aspheric, and
wherein the reduction-side lens of the two lenses in the first lens group has a concave surface facing the reduction side of the zoom lens, and
wherein the positive lens in the second lens group has a convex surface facing the magnification side, and
wherein the positive lens in the third lens group has a convex surface facing the magnification side, and
wherein the fourth-group-first lens of the three lenses in the fourth lens group has a concave surface facing the magnification side, and
wherein the fourth-group-third lens of the three lenses in the fourth lens group has a convex surface facing the reduction side.

18. A zoom lens for projection, as defined in claim 16, wherein the following formula (7) is satisfied:

$$3.0 < |f_{L4}/fw| \quad (7), \text{ where}$$

fw is a focal length of the entire system of the zoom lens at a wide angle end, and
$f_{L4}$ is a focal length of the magnification-side lens in the first lens group.

19. A zoom lens for projection, as defined in claim 16, wherein the following formula (8) is satisfied:

$$-20.0 < fn/fw < -0.5 \quad (8), \text{ where}$$

fw is a focal length of the entire system of the zoom lens at a wide angle end, and
fn is a focal length of the negative air lens.

20. A projection-type display apparatus comprising:
a light source;
a light valve;
an illumination optical system that guides rays of light output from the light source to the light valve; and
a zoom lens for projection, as defined in claim 16,
wherein the light valve optically modulates the rays of light output from the light source, and
wherein the zoom lens for projection projects the modulated rays of light onto a screen.

* * * * *